(12) United States Patent
Keil et al.

(10) Patent No.: US 7,904,331 B2
(45) Date of Patent: *Mar. 8, 2011

(54) SYSTEM TO QUANTIFY CONSUMER PREFERENCES

(75) Inventors: Sev K. H. Keil, New York, NY (US);
Dick R. Wittink, North Haven, CT (US);
Joel S. Binn, Scarsdale, NY (US); G. Adam Condo, Hoboken, NJ (US); Hiek Roelof van der Scheer, New York, NY (US)

(73) Assignee: True Choice Solutions, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/730,746

(22) Filed: Mar. 24, 2010

(65) Prior Publication Data
US 2010/0235226 A1   Sep. 16, 2010

Related U.S. Application Data

(63) Continuation of application No. 09/754,612, filed on Jan. 4, 2001, now Pat. No. 7,698,161.

(51) Int. Cl.
*G06Q 10/00* (2006.01)
(52) U.S. Cl. ......................................................... 705/10
(58) Field of Classification Search ...................... 705/10
See application file for complete search history.

(56) References Cited

U.S. PATENT DOCUMENTS

| | | | |
|---|---|---|---|
| 5,041,972 A | 8/1991 | Frost | |
| 5,124,911 A | 6/1992 | Sack | |
| 5,583,763 A | 12/1996 | Atcheson et al. | |
| 5,974,396 A | 10/1999 | Anderson et al. | |
| 5,983,220 A | 11/1999 | Schmitt | |
| 6,012,051 A | 1/2000 | Sammon et al. | |
| 6,029,195 A | 2/2000 | Herz | |
| 6,134,532 A | 10/2000 | Lazarus et al. | |
| 6,208,989 B1 | 3/2001 | Dockter et al. | |
| 6,236,975 B1 | 5/2001 | Boe et al. | |

(Continued)

OTHER PUBLICATIONS

"Active Sales Assistant 2001", Active Decisions, Inc., Jun. 2001, 12 pages.

(Continued)

*Primary Examiner* — Jonathan G Sterrett
(74) *Attorney, Agent, or Firm* — Fish & Richardson P.C.

(57) ABSTRACT

A system to determine preference information of part worth values associated with a consumer and a product includes determination of a plurality of attributes of the product, each of the plurality of attributes associated with a plurality of attribute levels, determination of a plurality of piles of attributes based on a first indication of the consumer, each of the plurality of piles comprising one or more of the plurality of attributes, determination of a ranked order of a plurality of attributes of one of the plurality of piles, determination of a relative importance of one or more of the plurality of attributes of the one of the plurality of piles based on a second indication of the consumer, determination of a scale value of one or more attribute levels of the one or more of the plurality of attributes of the one of the plurality of piles based on a third indication of the consumer, and determination of a part worth value associated with an attribute level of one of the plurality of attributes of the one of the plurality of piles based on a determined scale value of the attribute level and a determined relative importance of the one of the plurality of attributes.

21 Claims, 13 Drawing Sheets

U.S. PATENT DOCUMENTS

| | | |
|---|---|---|
| 6,236,978 B1 | 5/2001 | Tuzhilin |
| 6,298,348 B1 | 10/2001 | Eldering |
| 6,321,221 B1 | 11/2001 | Bieganski |
| 6,826,541 B1 | 11/2004 | Johnston et al. |
| 2002/0026390 A1 | 2/2002 | Ulenas et al. |
| 2002/0065721 A1 | 5/2002 | Lema et al. |
| 2002/0087388 A1 | 7/2002 | Keil et al. |
| 2009/0292588 A1 | 11/2009 | Duzevik et al. |
| 2009/0327163 A1 | 12/2009 | Swan et al. |

OTHER PUBLICATIONS

"Active Buyer's Guide: Dogs," Copyright © 2002, Active Decisions, Inc., downloaded frm http://www.activebuyerguide.com/abg/nav, Jul. 26, 2002, 10 pages.

"The ACA/HB Module for Hierarchical Bayes Estimation", *Sawthooth Software, Inc.* (Aug. 1999).

Magidson, Jay, and Vermunt, Jeroen K., "Latent Class Models".

"The CBC Latent Class Technical", *Copyright 2000, Sawtooth Software, Inc.*

Acatech, "Adaptive Conjoint Analysis" (Version 4), *Copyright Sawtooth Software, Inc.* (Apr. 1993).

McCullough, Dick, "Trade-off Analysis", *A Survey of Commercially Available Techniques*, Macro Consulting, Inc. Mar. 3, 2000. Jun. 25, 2008, www.macroinc.com> retrieved from http://web.archive.org.

Srinivasan, V. and Su Park, Chan "Surprising Robustness of the Self-Explicated Approach to Customer Preference Structure Measurement," *Journal of Marketing Research*, vol. XXXI/v (May 1997), 286-291.

Wittink, Dick R. and Keil, Sev K. "Continuous Conjoint Analysis".

Huber, Joel, "What We have Learned from 20 Years of Conjoint Research": *When to use Self-Explicated, Graded Pairs, Full Profiles or Choice Experiments.*

2001 Conference Presentations Set (Spring 2001), *Sawtooth Solutions.*

Orma, Bryan "Helping Managers Understand the Value of Conjoint", *Copyright, Sawtooth Software*, 1996.

Pinnell, Jon and Olsen, Pam "Using Choice-Based Conjoint to Assess Brand Strength and Price Sensitivity", *Copyright 1996, Sawtooth Software.*

Pinnell, Jon (1994) "Multistage Conjoint Methods to Measure Price Sensitivity".

Dawson, Neal V. (91-94) "A Model of Patients' Preferences in Serious Illness", http://www.ahcpr.gov/clinic/medteprp/list8.htm, (Download date Mar. 30, 2001).

Marketswitch: "Our Industry", http://www.marketswitch.com/products/industry.html, (Download dated Apr. 11, 2001.

Kanninen, Barbara, K. (Jan. 1, 2000-Jun. 6, 2002) "Optimal Experimental Design for Nonmarket Choice Experiments", http://www.espa.gov/ncerga_abstracts/grants/99/deci/kanninen.html, (Download dated Apr. 11, 2001).

Rollins, Kimberly and Beckett, Alexandria, "Using a Random Utility Model to Measure Willingness to Pay for Public Attributes of Green Goods: Implications for Market Provision of Environmental Quality", *International Institute of Fisheries Economics and Trade, Microbehavior and Macroresults IIFET 2000*, http://ors.edu/Dept/IIFET/2000/abstracts/rollins.html (Download date Apr. 11, 2001).

Ardila, Sergio, Quiroga, Ricardo and Vaughan, William J. (12/98m ENV-126, E) Publications "A Review of the Use of Contingent Valuation Methods in Project Analysis at the Inter-American Development Bank", http://www.iadb.org/sds/publication/publication_178_e.htm (Download date Apr. 11, 2001).

Understanding Market Segmentation, Technical Paper From DDS Research, httop://www.dssearch.com/marketsegment/Library/Segment/understanding.asp.

Tyner, Mary Jane and Weiner, Jonathan—MACRO—"Optimal Pricing Strategies Through Conjoint Analysis", http://www.macroinc.com/html/art/s_opt.html (Download dated Apr. 10, 2001).

"Customer Targeting Models", *Opti-Market Consulting*, http://www.opti-market.com/targeting.htm (Download date Apr. 10, 2001).

Johnson, Chad, Methodologies and Capabilities: "Market stimulation software becomes smarter all the time", *Answers Research, Inc.* http://answersresearch.com/methodlogies/article5.html (Download Apr. 10, 2001).

Market Research Application Example, "Conjoint Analysis: *The Presure*", Statistics & Operations Research, http://www.sas.com/rnd/app/da/market/mraexsim.html (Download date Apr. 10, 2001).

"Research Triangle Institute: Conjoint Analysis Software Tools", http://www.rti.org/difference/conjoint_tools.cfm (Download date Apr. 10, 2001).

Decision Support Inc., A Full Service Market Research & Consulting Firm, "Services Offered" http://www.decisionsupportinc.com/services.html (Download date Apr. 10, 2001).

Landsend.com, "My Personal Shopper: Like having a personal wardrobe" http://www.landend.com/vpsEntry.cgi?mode=GRAPHIC &refer=c.../&sid=098702323344 (Download date Apr. 11, 2001).

Direct1.com "About Direct1" http://direct1.com/company/whatdowedo.html (Download date Apr. 3, 2001).

Discretechoice.com "White Paper: Sample Discrete Choice Analysis", http://www.discretechoice.com/analysis.html (Download date Jan. 2, 2001).

Minetheme Knowledge Bank "Information: that Inspires". http://www.mindtheme.com/knowledge/trst.asp (Download Apr. 10, 2001).

Dominator 2000™ Market Stimulation Model From DSS Research, Dominator 2000™http://dssresearch.com/library/Dominator/dominator.asp (Download date Apr. 10, 2001).

Conjoint Analysis Tools, http:www.whitehorse.com.au/~prosoft/statist.htm (Download date Feb. 14, 2001).

Johnson, Richard M., Sawtooth Technologies: "Trade-Off Analysis of Consumer Values" reprinted from *Journal of Marketing Research*, published by the American Marketing Association, vol. 11 (May 1974), pp. 121-127, http://www.sawtooth.com/news/library/articles/johnson.htm (Download Feb. 14, 2001).

McCullough, Dick "The Cake Method: A Proprietary Hybrid Conjoint Approach", Macro Consulting, Inc. http://www.macroinc.com/html/art/s_cak.html (Download date Dec. 6, 2000).

ACA, "Adaptive Conjoint Analysis", http://www.sawtoothsoftware.com/ACA.htm (Download date Nov. 30, 2000).

Analysis: Conjoint Case Example From DDS Research—Marketing Research For . . . , http://www.dssresearch.com/conjoint/CaseExample/Analysis.asp (Download date Apr. 2, 2001).

A Reviw of Conjoint Analysis, Technical Paper From DSS Research: "Understanding Conjoint Analysis", http://www/dssresearch.com/conjoint/Library/Conjoint/conjoint.asp (Download date Apr. 2, 2001).

Novak, Tom "Online Exercises: Design Your Own Movie Theater Using Conjoint Analysis", Interactive Exercises, http://www2000.ogsm.vanderbilt.edu/novak/conjoint-Movies/ (Download date Apr. 11, 2001).

Mangen Research Associates, Inc., (1999) "Introduction to Conjoint Analysis", http://www.mraic.com/conj_intro.html (Download date Feb. 14, 2001).

Sawtooth Software, "Conjoint Analysis: ACA Description", http://www.sawtoothsoftware.com/aca.shtml (Download date Feb. 14, 2001).

Mangen Research Associates, Inc. (1999) "Correlation of Estimates—Conjoint Analysis", http://www.mrainc.com/estimate_conj.html (Download date Jan. 1, 2001).

Online Insight—Thanks for your time, file://D;\StarteHere.html (Download date Dec. 18, 2000).

Bajaj, Akhilesh. "Factors Relevant to Senior Information Systems Managers' Decisions to Adopt New Computing Paradigms: An Exploratory Study," 1998 [retrieved from Internet: http://lost-contact.mit.edu/afs/net/project/afs32/andrew.cmu.edu/supa/wpapers/1998].

Kislinger, Gunter. "Die Anwendung des Teilnutzenwertmodells in der Marktsegmentierung," Karl-Franzens-Universitaet Graz (Austria), 1990 [retrieved from Proquest].

Lau, Kin-nam. "Evaluating Consumer Preferences for Existing Multiattribute Products: a Non-Metric Approach," College of Business Administration, North Dakota State University, 1993 [retrieved from Internet].

Bajaj, Akhilesh, "A Study of Senior Information Systems Managers' Decision Models in Adopting New Computing Architectures", Journal of the Association for Information Systems, Jun. 2000 [retrieved from Internet].

Reibstein et al. "Conjoint Analysis Reliability: Empirical Findings," Marketing Science, Summer 1988 [retrieved from JSTOR].

Green et al. "Conjoint Analysis in Consumer Research: Issues and Outlook," The Journal of Consumer Research, Sep. 1978 [retrieved from JSTOR].

Desarbo et al. "Three-Way Multivariate Conjoint Analysis," Marketing Science, Autumn 1982 [retrieved from JSTOR].

Griffin et al. "The Voice of the Customer," Marketing Science, Winter 1993 [retrieved from JSTOR}.

P.E. Green, V. Srinivasan , "Conjoint analysis in marketing: new developments with implications for research and practice", The Journal of Marketing, 1990.

Proceedings of the 2000 Sawtooth Software Conference, Sequim Washington, pp. 1-268.

Paul E. Green and Abba M. Krieger, "Individualized Hybrid Models for Conjoint Analysis", Management Science, vol. 42, No. 6 (Jun. 1996), pp. 850-857.

Paul E. Green, Abba M. Krieger and Manoj. K. Agarwal, "A Cross validation test of our models for quantifying multiattribute preferences" Marketing Letters, Publisher Springer Netherlands, ISSN 0923-0645 (Print) 1573-059X (Online), Issue Voume 4, No. 4 / Oct. 1993.

René Y. Darmona and Dominque Rouzies, Internal Validity of Conjoint Analysis Under Alternative Measurement Procedures, vol. 46, Issue 1, Sep. 1999, pp. 67-81.

B. Orme, WC King, "Conducting full-profile conjoint analysis over the internet", accessed May 1998—business.nmsu.edu.

A Review of Conjoint Analysis, Jul. 1998 [retrieved from http://dssresearch.com/library/conjoint/conjoint.htm].

Cattin et al. "Commercial Use of Conjoint Analysis: A Survey," Journal of Marketing, Summer 1982 [retrieved from Dialog].

Green et al. "New Techniques for Measuring Consumers' Judgements of Products and Services," Sep. 1974 [retrieved from Internet].

"eBranding Study: Online Insight & Accenture—What is Conjoint?", http://ww.onlineinsight.com/ebranding/conjoint.html], (Apr. 27, 2001).

Paul, Larren, "1 to 1 Marketer" [www.1to1.com/Building/Customer-Relatinships/entry.jsp?REQUESTED_URL], (May 31, 2001).

Office Action issued in U.S. Appl. No. 10/635,387, mailed Jul. 9, 2008, 15 pages.

Notice of Allowance issued in U.S. Appl. No. 10/635,387, mailed May 20, 2009, 35 pages.

Pu, P., Chen, L., & Kumar, P., (2008). Evaluating product search and recommender systems for E-commerce environments. Electronic Commerce Research, 8(1-2),1-27. Retrieved Sep. 17, 2010, from ABlliNFORM Global. (Document ID: 148602791), 27 pages.

Notice of Allowance issued in U.S. Appl. No. 12/568,223 on Sep. 29, 2010, 40 pages.

| 296 |
|---|
| 410 |
| CONSUMER: JOHN PUBLIC; PRODUCT: LUXURY PASSENGER AUTOMOBILE |

| ATTRIBUTE 412 | ATTRIBUTE LEVELS/ASSOCIATED PART WORTH VALUE 414 |
|---|---|
| HORSEPOWER | 150 hp/X, 190 hp/0, 220 hp/5, 250 hp/10 |
| M.P.G. | 15 M.P.G./X, 25 M.P.G./0, 35 M.P.G./4 |
| MAKE | BMW/?, AUDI/?, MERCEDES/?, LEXUS/? |
| PRICE | $50,000/X, $45,000/0, $40,000/2.1 $35,000/4.9, $30,000/7 |

| CONSUMER: JOHN PUBLIC | LUXURY PASSENGER AUTOMOBILE | | | DATE COLLECTED: 12/12/01, 5:23 PM |
|---|---|---|---|---|
| ATTRIBUTE | ATTRIBUTE LEVEL/ASSOCIATED PART WORTH VALUE | | | |
| HORSEPOWER | 250 Hp UTILITY = 10 | 220 Hp UTILITY = 5 | 190 Hp UTILITY = 0 | 150 Hp UTILITY = X |
| PRICE | $30,000 UTILITY = 7 | $35,000 UTILITY = 4.9 | $40,000 UTILITY = 2.1 | $45,000 UTILITY = 0 | $50,000 UTILITY = X |
| M.P.G. | 35 M.P.G. UTILITY = 4 | 25 M.P.G. UTILITY = 0 | 15 M.P.G. UTILITY = X | |
| MAKE | MERCEDES UTILITY = ? | BMW UTILITY = ? | LEXUS UTILITY = ? | AUDI UTILITY = ? |

1100

"X" REPRESENTS PART WORTH VALUES THAT ARE UNKNOWN BECAUSE ASSOCIATED ATTRIBUTE LEVELS ARE UNACCEPTABLE TO CONSUMER. "?" REPRESENTS PART WORTH VALUES THAT ARE UNKNOWN BECAUSE ASSOCIATED ATTRIBUTES WERE DEEMED LESS IMPORTANT BY CONSUMER

SYSTEM TO QUANTIFY CONSUMER PREFERENCES

CROSS REFERENCE TO RELATED APPLICATIONS

This application is a continuation of U.S. patent application Ser. No. 09/754,612, filed Jan. 4, 2001, titled "System to Quantify Consumer Preferences," which is incorporated herein by reference in its entirety.

BACKGROUND OF THE INVENTION

1. Field Of The Invention

The present invention relates to systems for determining consumer preferences. More specifically, the invention relates to self-explicated trade-off analysis systems used to quantify consumer preferences with respect to product attributes and to product attribute levels.

2. Description Of The Related Art

Manufacturers are presented with many choices during the design of a product. For example, a manufacturer must choose from among several available product features, or attributes, when deciding which attributes to include in a product. Some attributes are optional while others must be included. In the case of a television set, "Chassis color" is an attribute that must be included and "Picture-in-picture" is an optional attribute. For each included attribute, a manufacturer must also choose an attribute level to associate with the attribute. Attribute levels which may be associated with the attribute "Chassis color" include "black", "white", "blue", etc.

Occasionally, a manufacturer produces several versions of a similar product by varying product attributes and/or attribute levels among the several versions. In such a case, the manufacturer must determine attributes and associated attribute levels to include in each version as described above. Moreover, the manufacturer must determine how many units of each version will be produced. For example, a manufacturer choosing to produce televisions having a black chassis and televisions having a blue chassis must also determine how many of each type of television to produce and offer for sale.

Product pricing represents a further choice presented to product manufacturers. In this regard, a manufacturer attempts to choose a price for each produced product that will maximize overall profit to the manufacturer. Of course, price may also be considered a product attribute, with associated attribute levels consisting of particular prices.

Each of the foregoing choices may be greatly facilitated if the manufacturer has detailed and accurate information relating to consumer preferences. A consumer, in this regard, is any entity to which a product and/or service may be offered. Such consumers include individuals, businesses, and purchasing managers. Consumer preference information can be used to determine the popularity and desirability to consumers of particular product attributes and attribute levels. Therefore, by using this information, a manufacturer is more likely to choose product configurations as well as production amounts and prices for each product configuration that maximize overall profit.

In view of its importance, manufacturers expend significant resources in their attempts to obtain detailed and accurate consumer preference information and to analyze marketplace choices. These resources are most commonly allotted to conventional consumer surveys. Such surveys typically consist of a list of predetermined questions designed to elicit information from a consumer regarding the consumer's feelings toward products, product attributes, and product attribute levels. Surveys may be administered randomly, for example by stopping consumers at shopping malls or other retail areas, or by contacting specific consumers who are targeted because they are members of a demographic group about which information is desired.

Conventional surveys present several inherent drawbacks. First, since survey results are compiled into general demographic categories, surveys merely determine, at best, preferences of a theoretical average consumer belonging to each demographic category. Accordingly, survey results are only marginally correlated to any one consumer's preferences. Therefore, such results lack predictive precision of a particular consumer's preferences with respect to marketplace choices available and not yet available. Second, although conventional surveys may indicate whether one attribute level (e.g. "black chassis color") is generally preferred over another level of the same attribute ("white chassis color"), such surveys do not provide any reliable means for comparing preferences across attributes. For example, conventional surveys are generally unable to determine the degree to which a consumer prefers a black chassis over another color so as to enable comparison between that degree and the degree to which the consumer prefers a 27" screen over another screen size. As a result of these drawbacks, conventional surveys are poor at producing useful quantified preference information of individual consumers.

Focus groups are another conventional vehicle used to obtain consumer preference information. In a typical focus group, certain consumers are randomly selected (or selected based on demographics as described above) to answer questions and/or to participate in a group discussion regarding a product or a type of product. Answers and comments put forth by the consumers are noted and tabulated to create preference information similar to that obtained using survey techniques. However, because of their interactive nature, focus groups tend to elicit information which is more pertinent than that elicited by surveys. Despite this advantage, focus groups still suffer from the drawbacks described above with respect to conventional surveys.

The field of trade-off analysis developed to address the above and other shortcomings in conventional techniques for determining consumer preference information. Generally, trade-off analysis techniques attempt to quantify a consumer's preference for a particular product's attributes and attribute levels. Such quantification is intended to allow a manufacturer to easily and accurately compare the attractiveness of various product configurations to a consumer. For example, trade-off analysis techniques allow a manufacturer to compare the attractiveness of a 27" television with Picture-in-picture capability priced at $399 with that of a 35" television with a digital comb filter priced at $599. This comparison is possible because the techniques associate a particular numerical value with a consumer's preference for each attribute and attribute level. Accordingly, the relative attractiveness of any attribute or attribute level with respect to any other attribute or attribute level can be determined simply by comparing the appropriate associated numerical values.

According to one classification scheme, four types of trade-off analysis techniques exist: conjoint; discrete choice; self-explicated; and hybrid. Conjoint analysis generally requires a consumer to rate or rank product configurations with respect to one another. Typically, the consumer is asked to rank twenty to thirty product configurations. Each ranked configuration includes different combinations of attributes and attribute levels being evaluated. By appropriately varying the configurations, a regression model can be estimated for each consumer.

Conjoint analysis is an improvement over conventional systems for determining consumer preferences. For example, determining preferences by observing consumer behavior is difficult because consumer behavior can usually be observed only with respect to a few combinations of attributes and attribute levels (i.e., the combinations that exist in the marketplace). Accordingly, it becomes difficult to separate and distinguish between the preferences of different consumers and to predict effects of changes in attributes and/or attribute levels on consumer behavior. On the other hand, conjoint analysis allows for improved learning of consumer preferences through controlled variation and controlled co-variation of attributes and attribute levels.

According to discrete choice analysis, a consumer is presented with a set of product configurations and asked to select either the configuration that the consumer is most interested in purchasing or no configuration if the consumer is not interested in purchasing any of the presented configurations. The process is then repeated for other sets of product configurations. In contrast to conjoint analysis, which may be used to estimate a regression model for individual consumers, discrete choice analysis may be used to estimate a mixture method (similar to a regression model) for a group of consumers.

While conjoint analysis and discrete choice analysis determine consumers' preferences indirectly, self-explicated analysis directly determines preferences by asking consumers how important each product attribute range and attribute level range is to their purchasing decisions. According to some self-explicated analysis models, consumers are presented with all attributes and attribute levels to be evaluated, and asked to identify attribute levels that are unacceptable. An unacceptable attribute level is one that, if included in a product, would cause the product to be completely unacceptable to the consumer, regardless of any other attributes and attribute levels included in the product. For example, a consumer may indicate that an automobile including an attribute level of "pink" associated with the attribute "color" is completely unacceptable regardless of any other attributes or attribute levels included in the automobile. Accordingly, "pink" is identified as an unacceptable attribute level for that consumer.

Next, the consumer is asked to identify, from the acceptable attribute levels, the most-desirable and the least-desirable attribute levels associated with each presented attribute. Assuming that the consumer's most important attribute has a rating of 100, the consumer is then asked to rank the relative importance of each remaining attribute from 0 to 100. Next, for each attribute, the desirability of each attribute level is rated with respect to all other acceptable attribute levels of the attribute. A consumer preference for an attribute level is then obtained by multiplying the relative importance of its associated attribute by its desirability rating.

Hybrid analysis techniques utilize a combination of features from the above-described techniques. The most common example of a hybrid analysis technique is Adaptive Conjoint Analysis (ACA), a product of Sawtooth Software, Inc. According to ACA, a consumer is taken through several rankings of attribute levels and ratings of relative attribute importance (similar to self-explicated techniques) and then asked to identify, for each of a series of pairs of product configurations, which one of the pair is the most desirable and the degree to which it is more desirable. Other examples of hybrid models include the Cake Method and the Logit-Cake Method developed by MACRO Consulting, Inc.

Each of these trade-off analysis techniques requires consumers to provide consistent, thoughtful responses to presented inquiries. A consumer may be able to provide such responses if presented with a small number of inquiries, but is unlikely to do so if presented with many inquiries. In this regard, the number of inquiries presented by each of the above techniques increases sharply as the number of evaluated attributes and/or attribute levels increases. Such an increase in the number of inquiries also causes a corresponding increase in the amount of time required to answer the inquiries. Therefore, as more attributes and attribute levels are evaluated, various forms of consumer bias are likely to increase, such as a waning attention span, a lack of time, a lack of patience, boredom, and haste. These increased consumer biases result in increased consumer error and inaccurate preference information. Also increased is a consumer's tendency to abandon the technique and to simply cease answering further inquiries, in which case the resulting preference information is partially or totally unusable.

Another form of consumer bias is caused by consumer attitudes toward particular attributes and/or attribute levels. As described above, conventional trade-off analysis techniques ask a consumer to evaluate the importance of an attribute or attribute level with respect to other attributes or attribute levels. However, if the consumer has an extreme dislike for one of the attributes or attribute levels, the consumer may overestimate the importance of the other attributes or attribute levels.

In view of the foregoing, what is needed is a trade-off analysis system to quantify consumer preferences which addresses the forms of consumer bias experienced by conventional systems and which also produces an accurate and useful picture of consumer preferences with respect to product attributes and attribute levels.

SUMMARY OF THE INVENTION

In order to address the foregoing need, the present invention provides a trade-off analysis system to determine preference information of part worth values associated with a consumer and a product. The system includes determination of a plurality of attributes of the product, each of the plurality of attributes associated with a plurality of attribute levels, determination of a plurality of piles of attributes based on a first indication of the consumer, each of the plurality of piles comprising one or more of the plurality of attributes, determination of a ranked order of a plurality of attributes of one of the plurality of piles, determination of a relative importance of one or more of the plurality of attributes of the one of the plurality of piles based on a second indication of the consumer, determination of a scale value' of one or more attribute levels of the one or more of the plurality of attributes of the one of the plurality of piles based on a third indication of the consumer; and determination of a part worth value associated with an attribute level of one of the plurality of attributes of the one of the plurality of piles based on a determined scale value of the attribute level and a determined relative importance of the one of the plurality of attributes.

By virtue of the above features, the present invention, in some aspects, reduces the consumer bias experienced by conventional systems by reducing the number of inquiries that must be answered in order to determine accurate and useful preference information with respect to a given number of attributes and attribute levels. By reducing the number of inquiries, an amount of time required from a consumer to answer inquiries is also reduced, and each of these factors reduces a possibility that a consumer will lose interest or concentration and therefore provide inaccurate answers or stop providing answers.

Moreover, the foregoing features provide useful preference data in cases where a consumer can only be asked a limited number of questions or can only be asked questions over a limited time period. In this regard, the piles can be determined so as to limit the number of questions or time required to produce useful preference information. Unlike the conventional techniques mentioned above, piles also allow customization of attributes and attribute levels during evaluation to consumer preference information.

Further to the above aspect, the plurality of piles may be determined based on an indication that one or more of the plurality of attributes are more important to the consumer than another one or more of the plurality of attributes. According to this further aspect, a relative importance designated by a consumer of attributes in a pile may be more accurate since the pile includes attributes of similar importance to the consumer. That is, designated relative importances of each attribute in a pile may be less likely to be skewed than as in conventional systems, where skew may result from requiring a consumer to rate certain attributes relative to significantly less-important or more-important attributes.

According to another aspect, the present invention relates to a system to provide an offer to a consumer, including reception of an indication of a part worth value associated with the consumer and with an attribute level of an attribute of a product based on information provided by the consumer, determination of an offer based on the part worth value, and transmission of the offer to the consumer. In related aspects, the indication is determined rather than received and/or the indication is an indication of preference information. Nevertheless, these aspects allow presentation of an offer to a consumer based on preference information of the consumer. Accordingly, the offer can be designed so as to maximize attractiveness to the consumer and profit received by the manufacturer.

In an additional aspect, the present invention concerns a system to determine preference information associated with a consumer and a product, comprising transmission of a request for a ranked order of the consumer of a plurality of attributes associated with the product, and transmission of a request for a rating of the consumer of an importance of at least one of the plurality of attributes relative to a highest-ranked attribute. By separately transmitting the request for the ranked order and the request for the rating according to this aspect of the invention, each task is made easier and confusion of the consumer is reduced. As a result, both the ranked order and the rating are likely to be more reflective of a consumer's true preferences than in conventional systems which ask simply for a rating or simultaneously for a rank and a rating. Moreover, this aspect allows for detection of errors in a case that a received ranked order is inconsistent with a subsequently-received ranking.

The present invention also relates to a system to determine consumer preference information that includes presentation of a gaming interface to the consumer, reception of input of the consumer to the gaming interface, and determination of the consumer's preference information based on the received input. This aspect of the invention also reduces consumer bias by maintaining a consumer's interest in responding and in continuing to respond to requests for input.

With these and other advantages and features that will become hereafter apparent, a more complete understanding of the nature of the invention can be obtained by referring to the following detailed description and to the drawings appended hereto.

BRIEF DESCRIPTION OF THE DRAWINGS

FIG. 6 is a representative view of a tabular portion of a preference information database according to embodiments of the present invention.

FIG. 13 is a view of consumer preference information as presented to a client according to embodiments of the present invention.

DETAILED DESCRIPTION

Figure 1:
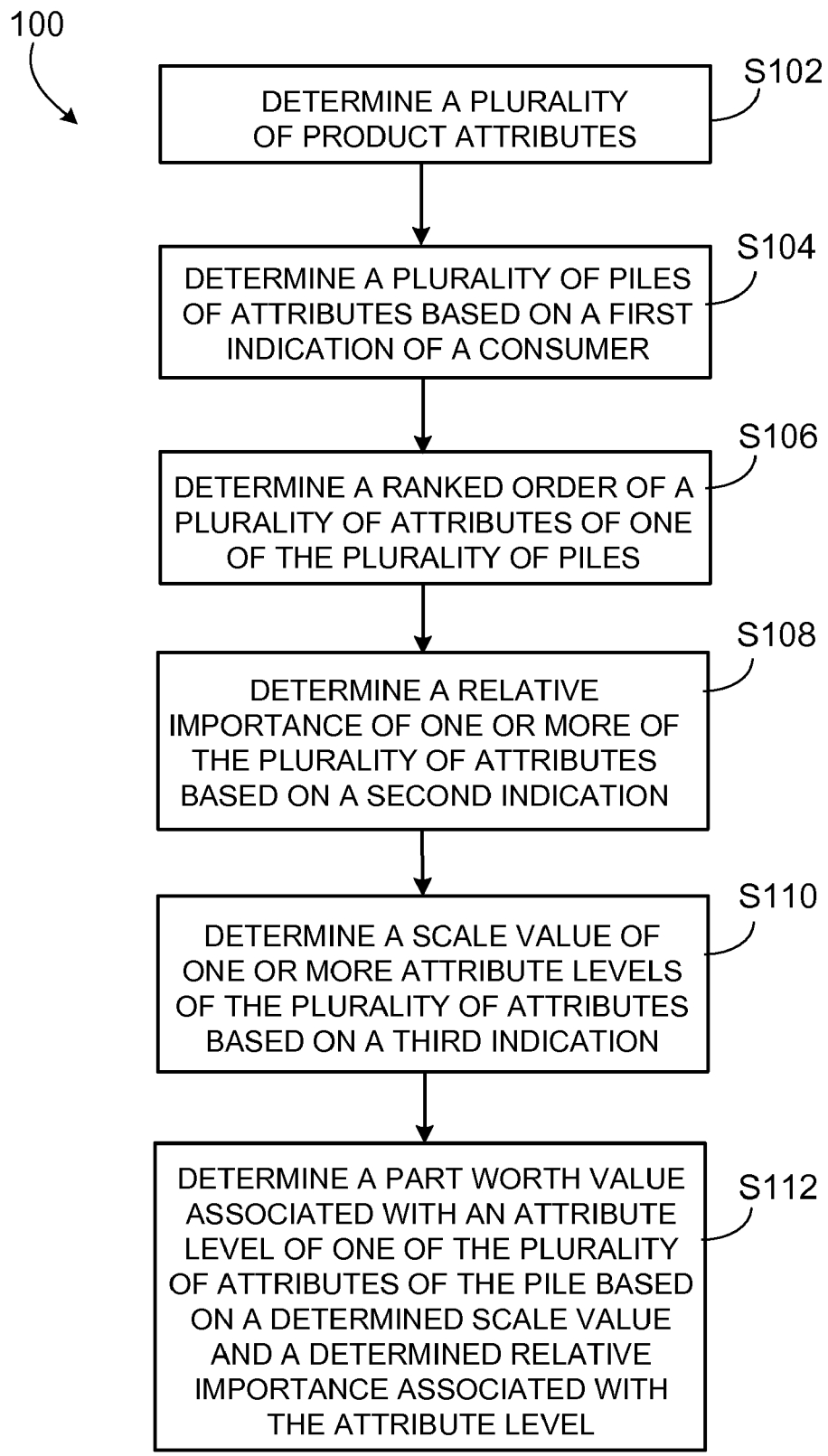
FIG. 1 is a flow diagram of process steps to quantify consumer preferences according to embodiments of the present invention.

FIG. 1 is a flow diagram of process steps 100 according to embodiments of the invention. Process steps 100 will be described initially below without reference to a specific example in the interest of providing an immediate introduction to features of the present invention. Accordingly, process steps 100 will be described later with respect to a specific example and specific hardware and software embodiments, along with details of alternative embodiments.

Process steps 100 begin at step S102, in which a plurality of product attributes are determined for a particular product. Each product attribute is associated with a plurality of attribute levels. The product attributes and attribute levels may be determined based on information obtained from a manufacturer of the product. Generally, the attributes and attribute levels are features for which the manufacturer wishes to obtain consumer preference information. It should be understood that, although the present disclosure primarily discusses manufacturers, the present invention may be utilized by sellers, distributors or other parties interested in obtaining consumer preference information. Moreover, the term products is used herein to refer to products and/or services.

After step S102, a plurality of piles of attributes are determined based on a first indication of a consumer in step S104. Each of the plurality of piles includes one or more product attributes. In order to determine the plurality of piles, the consumer is asked to group the plurality of product attributes according to their importance. For example, the attributes may be grouped into three piles representing least-important attributes, most-important attributes, and other attributes. Flow then proceeds to step S106.

In step S106, a ranked order of a plurality of attributes of one of the plurality of piles is determined. Step S106 is performed by receiving a ranking of each attribute in a pile from a consumer and determining a ranked order therefrom. Next, in step S108, a relative importance of one or more of the plurality of attributes of the pile to another attribute of the pile is determined based on a second indication of the consumer. The second indication is prompted by transmission of a question to the consumer such as "How important is the difference between (attribute level X) and (attribute level Y) of (attribute 1) relative to the difference between (attribute level A) and (attribute level B) of (attribute 2)?" The importance value is expressed in terms of a percentage, with the most-important attribute being associated with an importance value of 100%. In one embodiment, after completion of step S108, each of the one or more attributes of one of the plurality of piles is associated with a relative importance value. In another embodiment, only a portion of the one or more attributes of the one of the plurality of piles are associated with a relative importance value.

A scale value of one or more attribute levels of the pile is then determined in step S110 based on a third indication from the consumer. In order to determine a scale value, an indication from a consumer is received which assigns a value of 0 to a least-desirable attribute level associated with a particular attribute, and a value of 10 to a most-desirable attribute level associated with the particular attribute. Furthermore, the indication assigns each other attribute level associated with the particular attribute a value between 0 and 10. A scale value of an attribute level may be generated by asking the consumer to rate the scale value with respect to the least-desirable and the most-desirable attribute levels Next, a part worth value is determined in step S112. A part worth value is a value which represents a consumer's preference, or utility, for a particular attribute level. Advantageously, part worth values according to embodiments of the invention may be used to compare differences in attribute levels associated with different attributes in terms of their respective desirability.

The part worth value determined in step S112 is associated with an attribute level of one of the plurality of attributes of the pile. Specifically, the part worth value is determined by multiplying a scale value of the attribute level (determined in step S110) by the relative importance of the associated attribute (determined in step S108). For example, the part worth value of the most-desirable attribute level of the most-important attribute equals 10×100%=10, while the part worth value of the least-desirable attribute level of the most-important attribute equals 0×100%=0. As can be understood, the part worth value of a least-important attribute level associated with any attribute equals 0.

As described above, embodiments of process steps 100 reduce potential consumer bias by reducing a number of inquiries that must be answered in order to determine accurate and useful preference information. The reduced number of inquiries and reduced amount of time required from a consumer to answer inquiries decreases a possibility that a consumer will lose interest or concentration and therefore provide inaccurate answers. Moreover, reduction in the number of inquiries results in less data to store and to analyze.

Process steps 100 may also provide useful preference data in cases where a consumer can only be asked a limited number of questions or can only be asked questions over a limited time period. In these cases, the piles can be determined so as to limit the number of questions or time required to produce useful preference information. Further, in cases where the plurality of piles are determined based on an indication that one or more of the plurality of attributes are more important to the consumer than another one or more of the plurality of attributes, a consumer may more accurately provide a relative importance of each attribute in a pile. Thusly-provided relative importances are believed to be more accurate since the importances are less likely to be skewed by the consumer's feelings toward an attribute in the pile that is significantly less important or more important than other attributes in the pile.

Network Architecture

Figure 2:
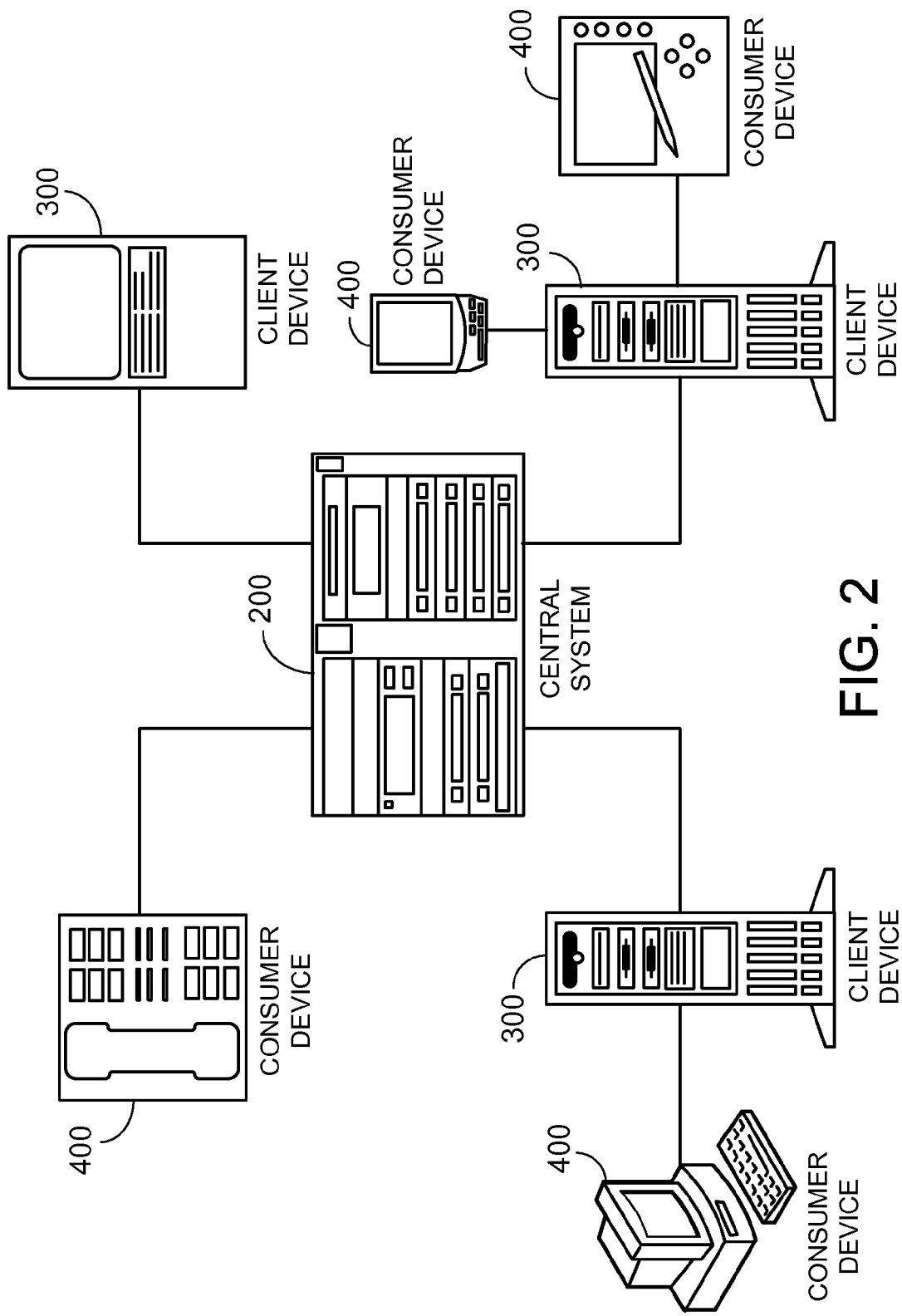
FIG. 2 is a topographic view of a network architecture according to embodiments of the present invention.

FIG. 2 is a topographic view of a network architecture according to embodiments of the present invention. Of course, many other architectures may be used to implement the invention. Shown in FIG. 2 is central system 200, depicted as a mainframe computer. Central system 200 may be used to perform the process steps 100 of FIG. 1 in order to determine preference information of part worth values associated with a consumer and a product. Central system 200 may be operated by a company, such as assignee Blue Flame Data, Inc., providing trade-off analysis services to manufacturers or other clients desiring to obtain consumer preference information.

In operation, central system 200 may use data input by consumers and clients, as well as legacy data, third party data and/or observed behavior data to produce such preference information. It should be noted that many other types of computing hardware may be used to perform the functions of central system 200, including, but not limited to, a server, a workstation, a network, or any combination of one or more of the foregoing. Further details of central system 200 are set forth below with respect to FIG. 3.

In communication with central system 200 are several client devices 300. Client devices 300 according to the present invention may be used by a product manufacturer to transmit attributes and attribute levels for a given product to central system 200 in order to have central system 200 determine part worth values associated with each attribute and attribute level. Of course, central system 200 may determine the attributes and attribute levels using data from other sources. Other information which may be transmitted from client devices 300 to central system 200 includes information for modifying thresholds or other parameters used by the central system 200 to determine preference information according to the present invention.

Client devices 300 may also receive information from central system 200 intended for display to a manufacturer or another client. Such information may include real-time monitoring of consumer responses, scenario simulations, or an interface allowing the operator to tweak existing thresholds or parameters while information is being gathered from consumers. Of course, the manufacturer may also use client device 300 to view preference information received from central system 200 by client device 300.

As shown in FIG. 2, client device 300 may include a server and/or a kiosk. Any other suitable device may be used as client device 300 according to the invention, including but not limited to a workstation, a mainframe computer, and a computer terminal. In the case that client device 300 is a device having its own input and/or output devices, such as a kiosk, a consumer may also use client device 300 to input answers to inquiries posed according to the invention and to input other indications to central system 200. Accordingly, client device 300 may also be used in such a case to present an interface to the consumer that allows the consumer to input such information.

Information may also be transmitted to or received from consumers as described above through consumer devices 400. Shown in FIG. 2 are consumer devices 400 represented by a telephone, a personal digital assistant, a workstation, and a pen-based computer. The shown consumer devices 400 are used to communicate with client devices 300 and, in the case of telephone consumer device 400, directly with central system 200. In this regard, consumer devices 400 usable in conjunction with the present invention include any device capable of presenting information to a consumer, visually and/or aurally, and of transmitting an indication made by the consumer to an external device. Of course, consumer devices 400 should be able to communicate with the device or devices with which they are in communication over whatever type of network media exist between the devices.

Although the connections illustrated between the components of FIG. 2 appear dedicated, it should be noted that each of the connections may be shared by other components. Moreover, the connections may comprise one or more of a local area network, a wide area network, a telephone network, a cellular network, a fiber-optic network, a satellite network, an infra-red network, a radio frequency network, or any other type of network which may be used to transmit information between devices. Additionally, the devices shown as in communication with other devices need not be constantly exchanging data, rather, the communication may be established when necessary and severed at other times or always available but rarely used to transmit data.

Central System

Figure 3:
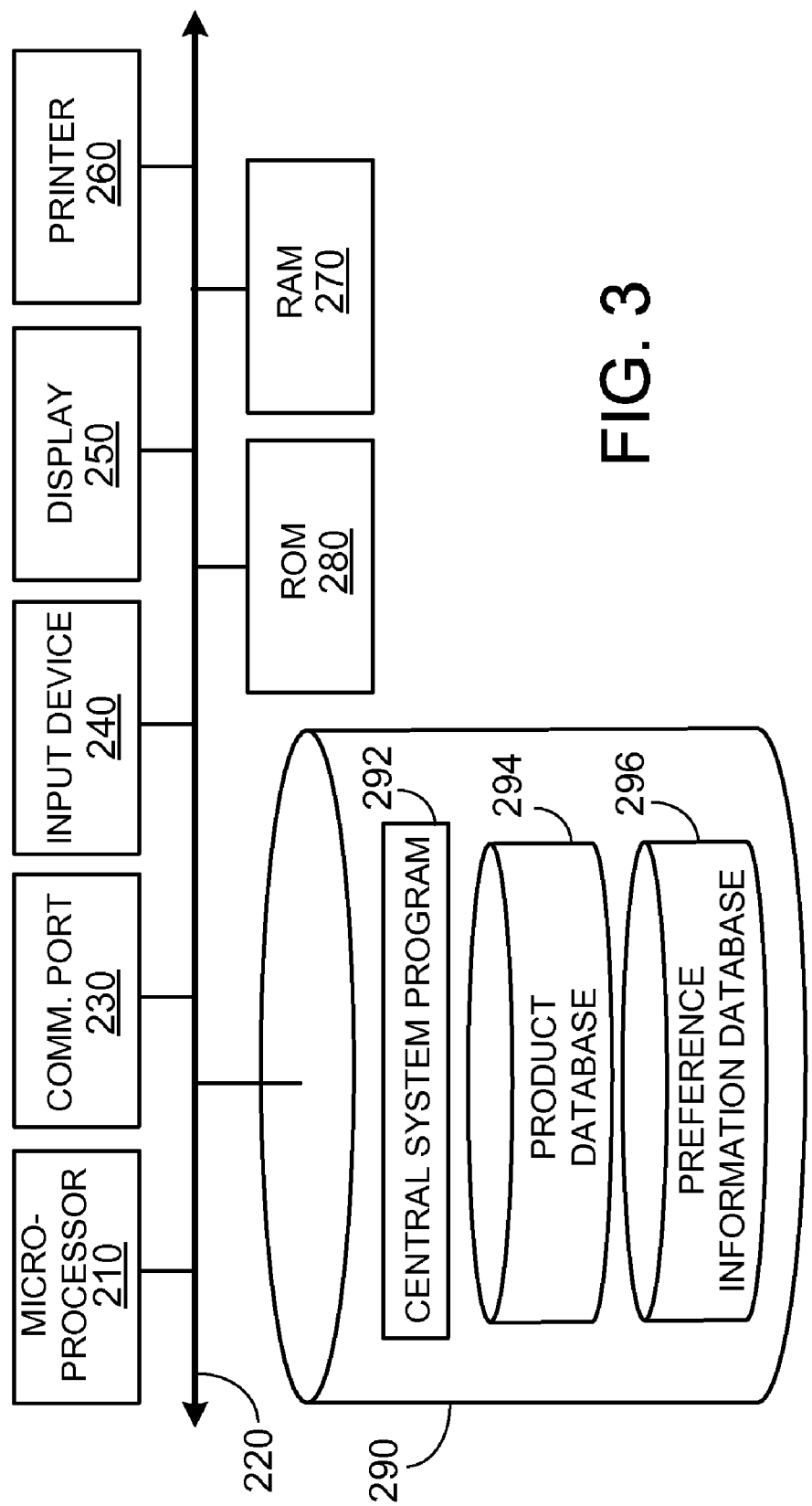
FIG. 3 is a block diagram of an internal architecture of a central system according to embodiments to the present invention.

FIG. 3 is a block diagram of the internal architecture of central system 200 according to embodiments of the invention. As illustrated, central system 200 includes microprocessor 210 in communication with communication bus 220. Microprocessor 210 may be a Pentium, RISC-based, or other type of processor and is used to execute processor-executable process steps so as to control the components of central system 200 to provide desired functionality.

Also in communication with communication bus 220 is communication port 230. Communication port 230 is used to transmit data to and to receive data from external devices. Communication port 230 is therefore preferably configured with hardware suitable to physically interface with desired external devices and/or network connections. In one embodiment, inquiries to present to consumers and indications from consumers are transmitted to and received from client devices 300 over communication port 230.

Input device 240, display 250 and printer 260 are also in communication with communication bus 220. Any known input device may be used as input device 240, including a keyboard, mouse, touch pad, voice-recognition system, or any combination of these devices. Input device 240 may be used by an operator to input product-related information such as attributes and attribute levels, consumer-related information such as contact and identification information, client-related information such as billing and transaction information, and commands to central system 200. In this regard, a command may be input to central system 200 to output a report detailing a particular client's account or a particular consumer's preference information.

Such a report may be output to display 250, which may be an integral or separate CRT display, flat-panel display or the like. Display 250 is used to output graphics and text to an operator in response to commands issued by microprocessor 210. Printer 260 is also an output device, but produces a hardcopy of data using ink-jet, thermal, dot-matrix, laser, or other printing technologies.

RAM 270 is connected to communication bus 220 to provide microprocessor 210 with fast data storage and retrieval. In this regard, processor-executable process steps being executed by microprocessor 210 are typically stored temporarily in RAM 270 and executed therefrom by microprocessor 210. ROM 280, in contrast, provides storage from which data can be retrieved but to which data cannot be stored. Accordingly, ROM 280 is used to store invariant process steps and other data, such as basic input/output instructions and data used during system boot-up or to control communication port 230.

Data storage device 290 stores, among other data, central system program 292 of processor-executable process steps. According to embodiments of the present invention, the process steps of central server program 292 may be read from a computer-readable medium, such as a floppy disk, a CD-ROM, a DVD-ROM, a Zip disk, a magnetic tape, or a signal encoding the process steps, and then stored in data storage device 290. Microprocessor 210 executes instructions of program 292, and thereby operates in accordance with the present invention, and particularly in accordance with the process steps described in detail herein.

Specifically, according to embodiments of the invention, microprocessor 210 executes processor-executable process steps of central system program 292 to provide for determination of a plurality of attributes of a product, each of the plurality of attributes associated with a plurality of attribute levels, determination of a plurality of piles of attributes based on a first indication of a consumer, each of the plurality of piles comprising one or more of the plurality of attributes, determination of a ranked order of a plurality of attributes of one of the plurality of piles, determination of a relative importance of one or more of the plurality of attributes of the one of the plurality of piles based on a second indication of the consumer, determination of a scale value of one or more attribute levels of the one or more of the plurality of attributes of the one of the plurality of piles based on a third indication of the consumer; and determination of a part worth value associated with an attribute level of one of the plurality of attributes of the one of the plurality of piles based on a determined scale value of the attribute level and a determined relative importance of the one of the plurality of attributes.

Also according to embodiments of the invention, the process steps allow for reception (or determination) of an indication of a part worth value (or of preference information) associated with a consumer and with an attribute level of an attribute of a product based on information provided by the consumer, determination of an offer based on the part worth value, and transmission of the offer to the consumer. Moreover, the process steps provide a system to determine preference information through a first transmission of a request for a ranked order of a consumer of a plurality of attributes associated with a product, and a second transmission of a request for a rating of the consumer of an importance of at least one of the plurality of attributes relative to a highest-ranked attribute.

In alternative embodiments, hard-wired circuitry may be used in place of, or in combination with, processor-executable process steps for implementation of the processes of the present invention. Thus, embodiments of the present invention are not limited to any specific combination of hardware and software.

Also included in central system program 292 may be processor-executable process steps to provide a World Wide Web server. Such a Web server would allow central server 200 to communicate with client devices 300 and consumer devices 400 through the World Wide Web. In addition, program 292 may include process steps of an interactive voice response system enabling central system 200 to transmit inquiries to and receive responses from a consumer using a telephone consumer device 400.

Central system program 292 may be stored in data storage device 290 in a compressed, uncompiled and/or encrypted format. Central system program 292 furthermore includes program elements that may be necessary for operation of central system 292, such as an operating system, a database management system and "device drivers" for allowing microprocessor 210 to interface with devices in communication with communication port 230. These program elements are known to those skilled in the art, and need not be described in detail herein.

Also stored in data storage device 290 is product database 294 and preference information database 296. Product database 294 includes information regarding products for which preference information has been or will be determined and preference information database 296 includes preference information determined according to the present invention. These databases will be discussed in detail with reference to FIGS. 5 and 6, respectively.

Client Device

Figure 4:
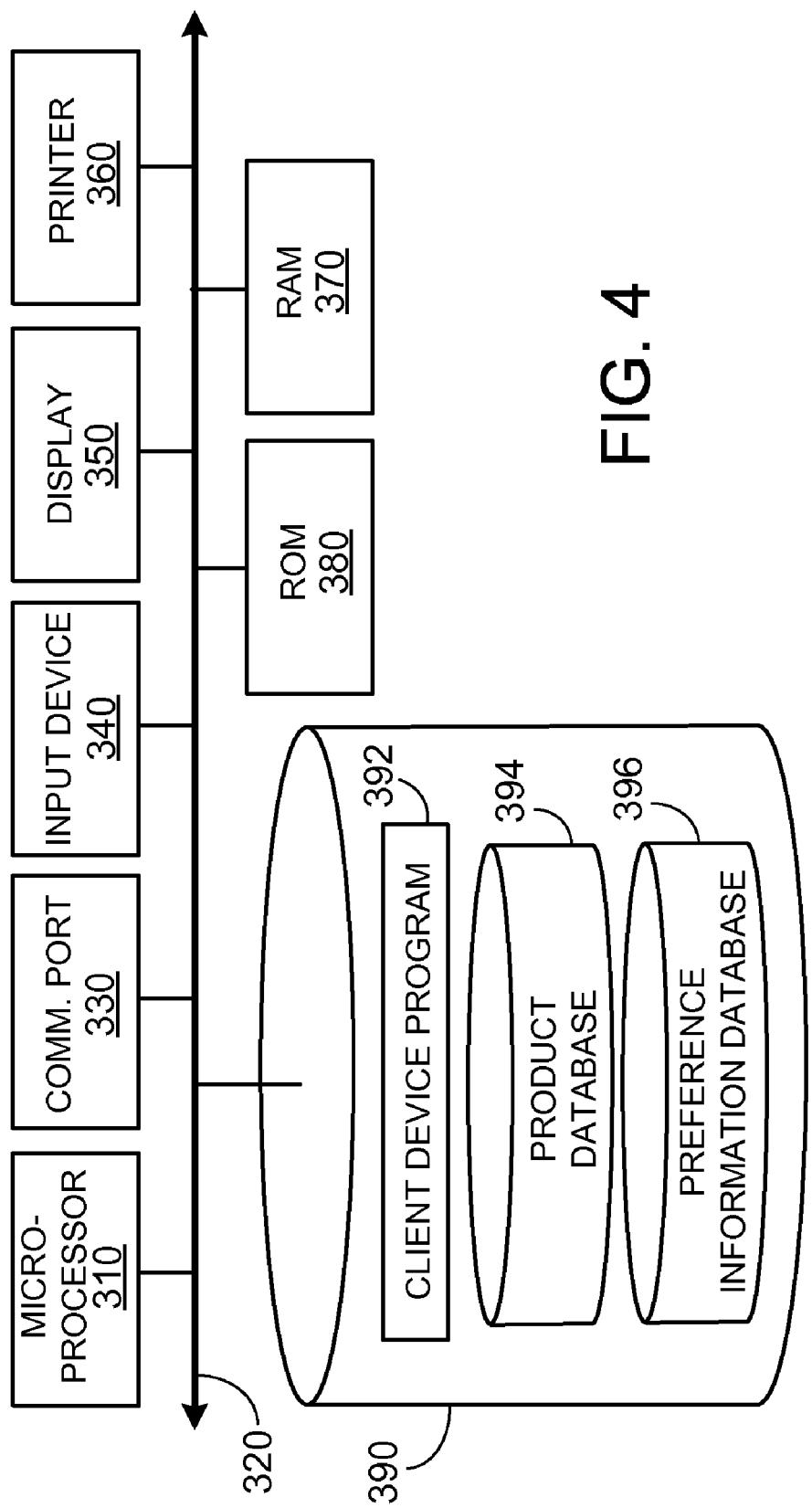
FIG. 4 is a block diagram of an internal architecture of a client device according to embodiments to the present invention.

FIG. 4 illustrates an internal architecture of client device 300. As shown, client device 300 according to the depicted embodiment includes microprocessor 310, communication port 330, input device 340, display 350, printer 360, RAM 370 and ROM 380, each of which is in communication with communication bus 320. Possible embodiments for each of these components are similar to those described with respect to identically-named components of FIG. 3, although functions performed by the components of FIG. 4 according to the invention may differ from those performed by the components of FIG. 3.

Specifically, input device 340 may be used by a manufacturer operating client device 300 to input product attributes and attribute levels for which preference information is sought, and also to input demographic information of a typical consumer from whom preference information is desired. Display 350 and printer 360 may be used to output information received from central system 200, such as consumer preference information, a recommended offer, an optimal product, or a consumer's willingness to pay. Of course, this information may be determined by client device 300 instead of being received from central system 200. In a case that client device 300 is a kiosk or other device usable by both a consumer and a client manufacturer, input device 340, display 350 and printer 360 may also be used by a consumer to receive inquiries from and to input answers to inquiries and other indications to central system 200.

Data storage device 390 stores client device program 392, product database 394 and preference information database 396. Client device program 392 includes processor-executable process steps which may be executed by microprocessor 310 to perform the process steps described herein. According to embodiments of the invention, client device program 392 includes process steps providing reception of an indication of a part worth value associated with the consumer and with an attribute level of an attribute of a product based on information provided by the consumer, determination of an offer based on the part worth value, and transmission of the offer to the consumer. As described above, such functionality allows presentation of an offer to a consumer that is tailored to the specific preference information of the consumer.

Client device program 392 may also include processor-executable process steps to provide a World Wide Web server. As described with respect to central system 200, a Web server would allow client device 300 to communicate with consumer devices 400 executing a Web browser. Client device program 392 may additionally include process steps of an interactive voice response system that provides automated communication with a consumer using a telephone consumer device 400.

The process steps of client device program 392 may be received from any computer-readable medium for storage in data storage device 390. According to some embodiments, client device program 392 is received from the entity operating central system 200 as part of a business solution offered by the entity. In this regard, the steps described above with respect to FIG. 1 and otherwise in conjunction with the invention may be performed by one or cooperatively by both of central system 200 and client device 300.

Product database 394 includes information similar to that included in product database 294. The information included in product database 394, however, is input in some embodiments by a manufacturer operating client device 300. Preference information database 396 includes consumer preference information that may be transmitted by central system 200 to client device 300 or may be generated by client device 300 according to the invention.

As mentioned above, product database 294 and preference information database 296 are described in detail below and depicted with sample entries in FIGS. 5 and 6. As will be understood by those skilled in the art, the tabular illustrations and accompanying descriptions of the databases merely represent relationships between stored information. A number of other arrangements may be employed besides those suggested by the tables shown. Similarly, the illustrated entries of the databases represent sample information only; those skilled in the art will understand that the number and content of the entries can be different from those illustrated.

Product Database

Figure 5:
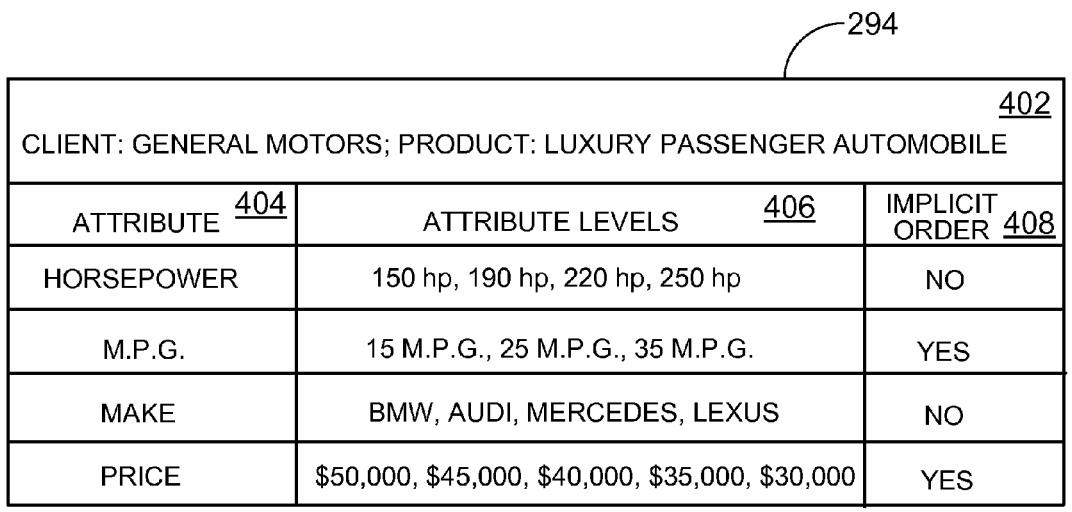
FIG. 5 is a representative view of a tabular portion of a product database according to embodiments of the present invention.

A tabular representation of a portion of product database 294 is shown in FIG. 5. Product database 294 stores data specifying attributes and associated attribute levels for particular products. Specifically, client:product field 402 indicates a client for whom the associated attributes 404 and attribute levels 406 are to be evaluated and a product with which the attributes 404 and attribute levels 406 are associated. Also associated with attribute 404 and attribute levels 406 in a single record is an implicit order flag 408. Implicit order flag 408 indicates whether or not associated attribute levels 406 can be assumed to be listed in order of consumer preference. Usage of implicit order flag 408 will be described below. It should be noted that attributes 404, attribute levels 406, and implicit order flags 408 may be specified by a consumer or by a client and received by central system 200 from client device 300 or from consumer device 400. Of course, attributes 404, attribute levels 406, and implicit order flags 408 of product database 294 may also be determined by central system 200 independently.

Although shown in FIG. 5 are data specifying particular attributes and attribute levels, the invention contemplates evaluating fewer or more attributes and/or attribute levels for any particular product. Additionally, it is contemplated that product database 294 may store data for multiple products and/or multiple clients. In contrast, it is contemplated for one embodiment that product database 394 stored in client device 300 might store only data associated with the particular client operating client device 300.

The data stored in product database 294 may be used in accordance with embodiments of the present invention to determine preference information relating to the attributes 404 and attribute levels 406. One such embodiment was described above with respect to FIG. 1. After such determination, the preference information may be stored in preference information database 296, and/or transmitted to client device 300 for storage in preference information database 396.

Preference Information Database

FIG. 6 shows a tabular representation of a portion of preference information database 296 according to embodiments of the invention. The data stored in preference information database 296 reflects preference information determined according to the invention. As shown by consumer:product field 410, the portion of the database shown reflects preference information of a single consumer with respect to a single product. Each record in the tabular portion includes a field specifying an attribute 412 and a field 414 specifying corresponding attribute levels as well as part worth values associated with each attribute level.

As mentioned with respect to product database 294, the data stored in preference information database 296 for a particular product may reflect fewer or more attributes and/or attribute levels than shown in FIG. 6. Furthermore, it is contemplated that preference information database 296 will store data corresponding to multiple consumers and to multiple products for each consumer. On the other hand, it is contemplated that product database 396 of client device 300 might store preference information of multiple consumers but corresponding only to those products to be sold by the particular client operating client device 300. As will be understood, those part worth values indicated as "?" are associated with attributes 412 deemed "less important" by a consumer.

SPECIFIC EXAMPLE

Although the example below is based on the FIG. 1 process steps, contemplated additional and/or alternative processing will also be described. It should be noted that the process steps of FIG. 1 and the other process steps described herein are described as being performed by central system 200 through execution of processor-executable process steps of central server program 292 by microprocessor 210. However, the process steps may also be performed, in whole or in part, by one or more of central system 200, client devices 300, consumer devices 400, another device, and manual means.

As described above, a plurality of product attributes for a subject product is determined in step S102. In the example set forth below, the subject product is a luxury passenger automobile, and the attributes are "Horsepower", "Miles per gallon (M.P.G.)", "Make" and "Price". Each determined attribute is associated with one or more attribute levels, which are shown associated with the attributes in product database 294 of FIG. 5. Accordingly, the attributes may be determined by central system 200 in step S102 by referring to attributes associated with the stored product in product database 294. The attributes may also be determined by central system 200 by receiving data representing the attributes from an operator via input device 240 or by receiving data representing the attributes from client device 300. In the latter case, client device 300 may retrieve the attributes from product database 394 or from an operator operating input device 340. Moreover, the attributes may be determined in step S102 by receiving the attributes from a consumer after identifying the product to the consumer. In this regard, the consumer may be asked to select or specify the attributes and/or attribute levels which are of concern to him when deciding whether to purchase the product.

After the attributes are determined, it is determined whether any attribute levels associated with the determined attributes are unacceptable to the consumer. In this regard, an unacceptable attribute level is an attribute level that, if included in a product, would prevent the consumer from purchasing the product, regardless of other attribute levels that may be included in the product. User interface 500 of FIG. 7 may be used to determine unacceptable attributes based on input from a consumer.

User interface 500 is presented to a consumer via consumer device 400. User interface 500, as well as the other user interfaces described below, may originate at central system 200 and be transmitted to consumer device 400 directly from central system 200 or from central system 200 through an intermediate device such as client device 300. Similarly, the user interfaces may originate at client device 300 and be transmitted to consumer device 400 directly or through an intermediate device.

Figure 7:
FIG. 7 is a view of an interface used to elicit information from a consumer according to embodiments of the present invention.

User interface 500, as shown, asks the consumer to identify unacceptable attribute levels of the determined attributes. The information included in user interface 500 reflects the information stored in product database 294 of central system 200. Using user interface 500, the consumer may identify from zero to all of the displayed attribute levels as being unacceptable. As shown in FIG. 7, the consumer has identified "150 hp", "15 M.P.G", and "$50,000" as unacceptable attribute levels.

Figure 8:
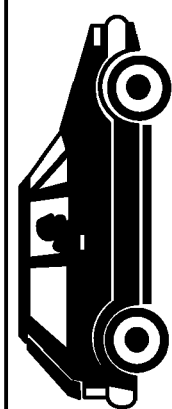
FIG. 8 is a view of an interface used to elicit information from a consumer according to embodiments of the present invention.

FIG. 8 shows user interface 600, which may be presented to a consumer following user interface 500. User interface 600 presents attributes along with associated attribute levels that are not indicated as unacceptable in user interface 500. Accordingly, FIG. 8 shows all the attributes and attribute levels shown in FIG. 7 except for those attribute levels deemed unacceptable. User interface 600 asks the consumer to identify the most-desirable and the least-desirable of the shown attribute levels. Alternatively, user interface 600 may ask the consumer to rank the desirability of each of the shown attribute levels of an attribute.

According to embodiments of the invention, an attribute and its associated attribute levels might not be shown in user interface 600 if the attribute levels have an implicit order. An implicit order is a ranked order of the desirability of attribute levels which is assumed based on expected consumer desires. For example, product database 294 indicates that the attribute levels of the attribute "Price" are listed in implicit order, as it may be assumed that a consumer would prefer, for example, a $30,000 automobile over a $35,000 automobile, all else being equal.

Alternatively, attribute levels having an implicit order may be shown in user interface 600, with the associated check boxes pre-checked based on the implicit order. Using the present example, such an embodiment would pre-check the check boxes indicating that "$30,000" is a most-desirable attribute level and that "$45,000" is a least-desirable attribute level of the attribute "Price".

Figure 9:
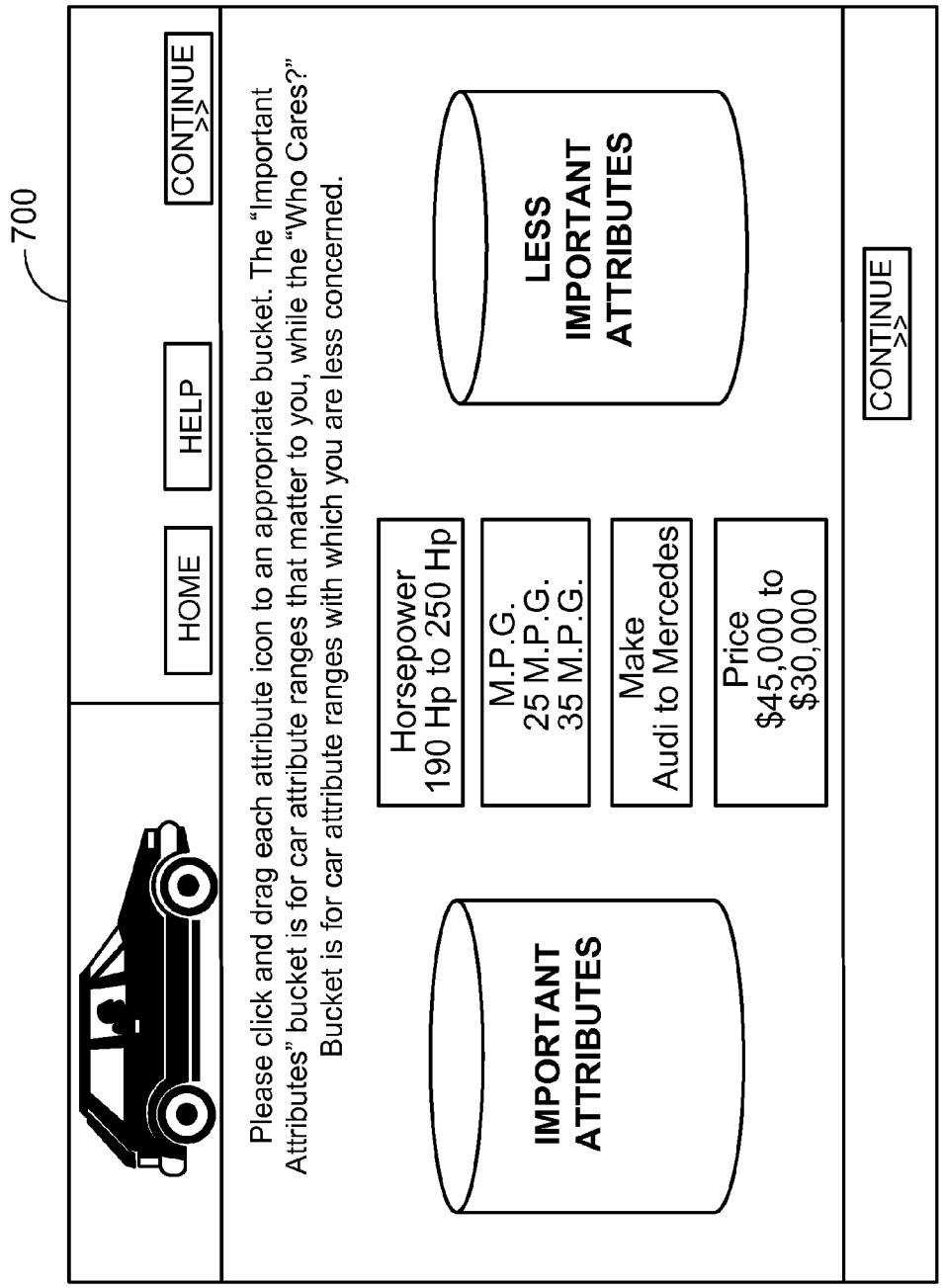
FIG. 9 is a view of an interface used to elicit information from a consumer according to embodiments of the present invention.

After the most-desirable and least-desirable attribute levels are determined, user interface 700 is presented in order to determine a plurality of piles of attributes based on an indication of the consumer, as described above with respect to step S104. As shown in FIG. 9, user interface 700 asks the consumer to identify each attribute as either "important" or "less important". The consumer manipulating user interface 700 of FIG. 9 has indicated that the attributes "Horsepower", "M.P.G" and "Price" are "important" and that the attribute "Make" is "less important". In terms of the present disclosure, the "important" and "less important" designations refer to separate attribute piles. It should be noted that more than two piles may be determined in accordance with the present invention, such as "very critical", "moderately critical", and "non-critical" piles. In other embodiments, user interface 700 is presented to a consumer to group attributes into piles only if the number of attributes is greater than a threshold. The threshold may depend on. the amount of time in which the process must be completed or on a maximum number of questions to be asked to the consumer, and may be set by central system 200, client device 300 or consumer device 400.

Figure 10:
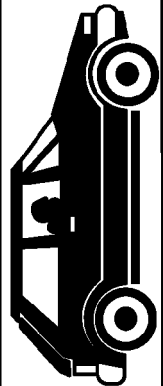
FIG. 10 is a view of an interface used to elicit information from a consumer according to embodiments of the present invention.

Next, according to step S106, user interface 800 of FIG. 10 is presented to the consumer so as to determine a ranked order of the attributes included in the "important" pile. Although user interface 800 allows ranking by assigning numbers to each attribute, a ranked order may also be determined by asking the consumer to specify a difference in desirability of the most-desirable and the least-desirable attribute level for each attribute. The attributes are then ranked according to the differences, with the attribute having the greatest difference being the most-important attribute.

Figure 11:
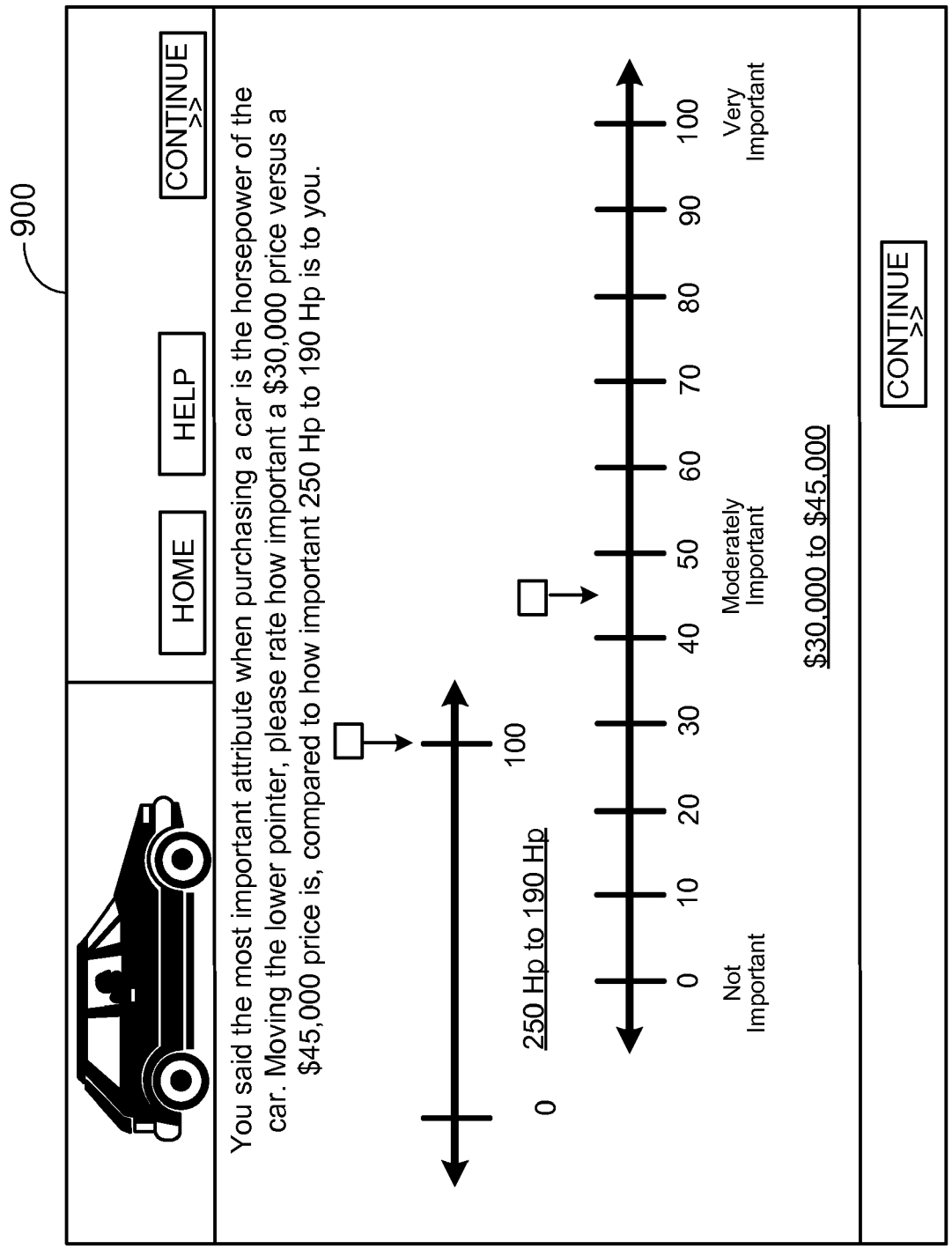
FIG. 11 is a view of an interface used to elicit information from a consumer according to embodiments of the present invention.
Figure 12:
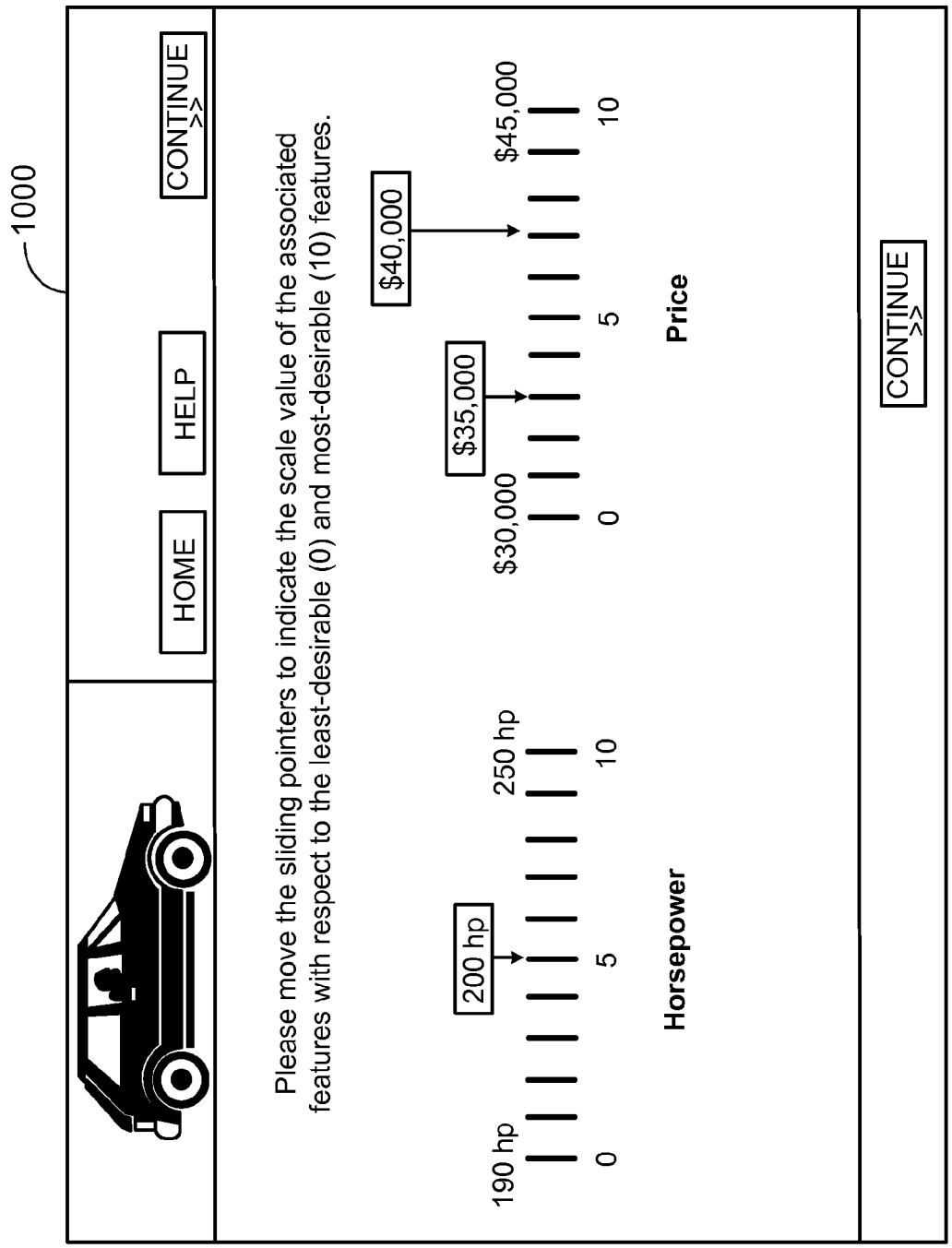
FIG. 12 is a view of an interface used to elicit information from a consumer according to embodiments of the present invention.

User interface 900 of FIG. 11 is then presented to the consumer to determine a relative importance of the attributes of the "critical" pile with respect to the most-important attribute. By determining relative importances after determining a ranked order, the process allows a consumer to make general relative comparisons between attributes before making more detailed relative comparisons. As a result, a consumer is able to more accurately assign relative importances to attributes than with prior systems.

In the embodiment of FIG. 11, the importance is determined by asking the consumer to rate, for each attribute other than the most-important attribute, the importance of the most-desirable attribute level versus the least-desirable attribute level as compared to the importance of the most-important attribute's most-desirable attribute level versus its least-desirable level. In the specific example, the most-important attribute was indicated as "Horsepower" using user interface 800, and the most-desirable and least-desirable attribute levels of the attributes "Price" and "Horsepower" were noted as "$30,000", "$45,000", "250 Hp", and "190 Hp", respectively, in the user interface 600. Therefore, user interface 900 asks the consumer to rate the importance of a $30,000 price to a $45,000 price as compared to the importance of the difference in horsepower. Also according to the example, the same question is asked with respect to the most-desired and least-desired attribute levels of "M.P.G.", the remaining attribute of the "important" pile.

In one embodiment, the above question is asked with respect to each attribute according to ranked order. That is, a relative importance of a second-ranked attribute is determined before the relative importance of a third-ranked attribute. Such an embodiment allows a consumer to more precisely indicate relative importances than embodiments in which the importances are not determined according to ranked order.

According to other embodiments, the consumer is asked to rate the importance of fewer than all of the remaining attributes of the "important" pile. For example, a consumer may be asked to rank the importance of the top 20 attributes or the top 20% of attributes in the "important" pile, based on the determined ranked order. The amount of attributes rated may be selected by the client, selected by the consumer, or assumed by central system 200 based on any factor, including a time allotted to receive information from the consumer. The unrated attributes according to these embodiments may be assigned importances based on their relative ranks. In this regard, in a case that a sixth-lowest ranked attribute is assigned a relative importance of 12%, the attributes having the five lowest ranks may be automatically assigned relative importances of 10%, 8%, 6%, 4%, and 2%, respectively. These embodiments advantageously provide accurate preference information while reducing an amount of time required to receive information from a consumer and thereby reducing several consumer biases.

The relative importances of all attributes may also be determined by designating the most-important attribute as having a relative importance of 100% and asking the consumer to specify percentage values for each other attribute in the pile. Moreover, the relative importance of an attribute may be determined by evaluating a rating of the consumer of the importance of the difference between the most-desirable and least-desirable attribute levels of the attribute relative to the difference between the most-desirable and least-desirable attribute levels of the most-important attribute.

Additionally, the relative importance may be determined in step S108 through a consumer rating of the importance of the difference between the most-desirable and least-desirable attribute levels of the attribute relative to the difference between the most-desirable and least-desirable attribute levels of the least-important attribute. The relative importances may also be based on the attribute ranking received through user interface 800, wherein, for example, the most-important attribute is assigned a 100% relative importance, the least-important attribute is assigned a 0% importance and the remaining attributes are spaced evenly within the intervening range.

Next, in step S110, scale values of each acceptable attribute level of the attributes in the "important" pile are determined. User interface 1000 illustrates one method of eliciting from the consumer the scale value of each attribute level associated with an attribute. In the present example, scale values need not be determined for those attributes of the pile associated with only two attribute values, such as "M.P.G.", since the remaining attribute levels are, by definition, the most-desirable and the least-desirable attribute levels and automatically assigned scale values of 10 and 0, respectively. As shown, the scale values may be determined as "5" for "220 hp" and "3" and "7" for each of "$40,000" and "$35,000".

The scale values may be determined based on a response to a question such as "How would you feel if you received a car having 220 Hp instead of 250 Hp, all else being equal?", in which the response may be one of a range of responses. Other methods include allowing the consumer to assign scale values to each attribute level. These methods allow checking of the accuracy of the consumer's responses, because the assigned scale values can be checked for inconsistency with the attribute level ranking input to user interface 600. For example, an inconsistency may be identified if "190 Hp" is indicated as a least-desirable attribute level but is given a scale value greater than the scale value of "220 Hp". The scale values may also be determined based solely on attribute level rankings, with a most-important attribute level and a least-important attribute level assigned to values 10 and 0, respectively, and with remaining attribute levels assigned values resulting in equidistant spacing of all the attribute levels.

After determination of the scale values, a part worth value of each attribute level may be determined based on the associated scale value and the relative importance of the associated attributes. In the present example, attribute level "220 hp" was determined to have a scale value of "5" based on consumer input to user interface 1000. Additionally, "Horsepower" was determined to be the most-important attribute based on input to user interface 800, and therefore was assigned a relative importance of 100% in step S108. Accordingly, the part worth value associated with "220 hp" is (100%×5)=5. Similarly, the part worth values corresponding to "190 hp" and "250 hp" are (100%×0)=0 and (100%×10)=10, respectively.

Taking the assumption that the relative importances determined in step S108 for attributes "M.P.G." and "Price" are 40% and 70%, respectively, preference information database 294 of FIG. 6 is populated with preference information determined according to the present example of an embodiment of the invention. More specifically, the part worth values associated with "M.P.G" attribute levels "25 M.P.G." and "35 M.P.G." are (40%×0)=0 and (40%×10)=4, and the values associated with "Price" attribute levels "$45,000", "$40,000", "$35,000", and "$30,000" are (70%×0)=0, (70%×3)=2.1, (70%×7)=4.9, and (70%×10)=7, respectively.

"?" symbols are shown in association with "Make" attribute levels because the attribute "Make" was placed in a "non-critical" pile and not evaluated in the example. Additionally, an unacceptable attribute level has no part worth value and the associated value is therefore represented by "X". In other embodiments, the part worth values of attribute levels associated with "non-critical" attributes are estimated based on the previously-determined ranks of the attribute levels.

FIG. 13 is a view of consumer preference information 1100 as presented to a client according to embodiments of the present invention. Consumer preference information 1100 is intended to provide a client with a comprehensible breakdown of consumer preference information determined according to the present invention. Preference information 1100 may be presented to the client in many ways, including by transmitting data representing preference information 1100 to client device 300, by transmitting a Web page including preference information 1100 to client device 300, by displaying preference information 1100 to the client using display 250 or display 350, and by providing to the client a hardcopy of preference information 1100 produced using printer 260 or printer 360. As shown, preference information 1100 reflects the data stored in preference information database 296 of FIG. 6.

Although the present invention has been described with respect to particular embodiments thereof, those skilled in the art will note that various substitutions may be made to those embodiments described herein without departing from the spirit and scope of the present invention.

What is claimed is:

1. A computer-implemented method for surveying a consumer and quantifying preferences of the consumer based on responses by the consumer to the survey, the method being performed as a consequence of execution of computer readable code by one or more processors of one or more corresponding computer systems, the method comprising:

receiving, using at least one of the processors, indications of attribute levels that a user designated as being acceptable for multiple different attributes that are characteristic of a product;

for each of the multiple attributes, receiving, using at least one of the processors, an indication of an attribute level designated by the user as being the user's least preferred attribute level for the attribute and an indication of an attribute level designated by the user as being the user's most preferred attribute level for the attribute;

receiving, using at least one of the processors, indications of attributes, from among the multiple attributes, that the user identified as attributes to be grouped together;

based on receiving the indications of attributes that the user identified as attributes that are to be grouped together, sorting, using at least one of the processors, the multiple attributes into at least two different groups of attributes, the different groups being disjoint and a particular one of the groups including the attributes that the user identified as attributes that are to be grouped together;

receiving, using at least one of the processors, an indication of a ranked order of the attributes belonging to the particular group;

based on receiving the indication of the ranked order of the attributes belonging to the particular group, identifying, using at least one of the processors, a particular attribute as an attribute that is most important to the user relative to the other attributes included within the particular group;

for each attribute among a subset of the attributes belonging to the particular group, receiving, using at least one of the processors, an indication of the importance of the difference between the user's least preferred attribute level for the attribute and the user's most preferred attribute level for the attribute relative to the difference between the user's least preferred attribute level for the most important attribute to the user and the user's most preferred attribute level for the most important attribute to the user;

for each attribute of the subset of attributes, assigning, using at least one of the processors, a relative importance value to the attribute based on the received indication of the importance of the difference between the user's least preferred attribute level for the attribute and the user's most preferred attribute level for the attribute relative to the difference between the user's least preferred attribute level for the most important attribute to the user and the user's most preferred attribute level for the most important attribute to the user;

for each of at least two attributes that belong to the particular group but that are not included in the subset of attributes, assigning, using at least one of the processors, a relative importance value to the attribute based on the ranking of the attribute within the ranked order of the attributes;

for each of several attributes belonging to the particular group:

assigning, using at least one of the processors, a scale value to the user's least preferred attribute level for the attribute, assigning, using at least one of the processors, a scale value to the user's most preferred attribute level for the attribute, and receiving, using at least one of the processors, an indication of a scale value for at least one acceptable attribute level other than the user's least preferred attribute level for the attribute and the user's most preferred attribute level for the attribute, the received indication of the scale value for the attribute level being relative to the scale values assigned to the user's least preferred attribute level and the user's most preferred attribute level;

for each of several attribute levels for which an indication of a scale value was received, calculating, using at least one of the processors, a part worth value for the attribute level as a function of the received indication of the scale value of the attribute level and the relative importance value assigned to the attribute to which the attribute level corresponds; and causing, using at least one of the processors, a graphical user interface to display at least one of the calculated part worth values.

2. The computer-implemented method of claim 1 wherein:

receiving indications of attributes, from among the multiple attributes, that the user identified as attributes to be grouped together includes receiving indications of attributes, from among the multiple attributes, that the user identified as attributes that the user prefers relative to others of the multiple attributes; and sorting the multiple attributes into at least two different groups of attributes based on receiving the indications of attributes that the user identified as attributes that are to be grouped together includes sorting the multiple attributes into at least two different groups of attributes based on receiving the indications of attributes that the user identified as attributes that the user prefers relative to others of the multiple attributes such that one of the groups includes the attributes that the user identified as attributes that the user prefers relative to others of the multiple attributes.

3. The computer-implemented method of claim 1 wherein calculating, for each of several attribute levels for which an indication of a scale value was received, a part worth value for the attribute level as a function of the received indication of the scale value of the attribute level and the relative importance value assigned to the attribute to which the attribute level corresponds includes multiplying the received indication of the scale value of the attribute level by the relative importance value assigned to the attribute to which the attribute level corresponds.

4. A computer-readable storage medium storing instructions that, when executed, cause a computer to:

receive indications of attribute levels that a user designated as being acceptable for multiple different attributes that are characteristic of a product;

for each of the multiple attributes, receive an indication of an attribute level designated by the user as being the user's least preferred attribute level for the attribute and an indication of an attribute level designated by the user as being the user's most preferred attribute level for the attribute;

receive, indications of attributes, from among the multiple attributes, that the user identified as attributes to be grouped together;

based on receiving the indications of attributes that the user identified as attributes that are to be grouped together, sort the multiple attributes into at least two different groups of attributes, the different groups being disjoint and a particular one of the groups including the attributes that the user identified as attributes that are to be grouped together;

receive an indication of a ranked order of the attributes belonging to the particular group;

based on receiving the indication of the ranked order of the attributes belonging to the particular group, identify a particular attribute as an attribute that is most important to the user relative to the other attributes included within the particular group;

for each attribute among a subset of the attributes belonging to the particular group, receive an indication of the importance of the difference between the user's least preferred attribute level for the attribute and the user's most preferred attribute level for the attribute relative to the difference between the user's least preferred attribute level for the most important attribute to the user and the user's most preferred attribute level for the most important attribute to the user;

for each attribute of the subset of attributes, assign a relative importance value to the attribute based on the received indication of the importance of the difference between the user's least preferred attribute level for the attribute and the user's most preferred attribute level for the attribute relative to the difference between the user's least preferred attribute level for the most important attribute to the user and the user's most preferred attribute level for the most important attribute to the user;

for each of at least two attributes that belong to the particular group but that are not included in the subset of attributes, assign a relative importance value to the attribute based on the ranking of the attribute within the ranked order of the attributes;

for each of several attributes belonging to the particular group:

assign a scale value to the user's least preferred attribute level for the attribute, assign a scale value to the user's most preferred attribute level for the attribute, and receive an indication of a scale value for at least one acceptable attribute level other than the user's least preferred attribute level for the attribute and the user's most preferred attribute level for the attribute, the received indication of the scale value for the attribute level being relative to the scale values assigned to the user's least preferred attribute level and the user's most preferred attribute level;

for each of several attribute levels for which an indication of a scale value was received, calculate a part worth value for the attribute level as a function of the received indication of the scale value of the attribute level and the relative importance value assigned to the attribute to which the attribute level corresponds; and cause a graphical user interface to display at least one of the calculated part worth values.

5. The computer-readable storage medium of claim 4 wherein:

the instructions that, when executed by a computer, cause the computer to receive indications of attributes, from among the multiple attributes, that the user identified as attributes to be grouped together include instructions that, when executed by a computer, cause the computer to receive indications of attributes, from among the multiple attributes, that the user identified as attributes that the user prefers relative to others of the multiple attributes; and the instructions that, when executed by a computer, cause the computer to sort the multiple attributes into at least two different groups of attributes based on receiving the indications of attributes that the user identified as attributes that are to be grouped together include instructions that, when executed by a computer, cause the computer to sort the multiple attributes into at least two different groups of attributes based on receiving the indications of attributes that the user identified as attributes that the user prefers relative to others of the multiple attributes such that one of the groups includes the attributes that the user identified as attributes that the user prefers relative to others of the multiple attributes.

6. The computer-readable storage medium of claim 4 wherein the instructions that, when executed by a computer, cause the computer to calculate, for each of several attribute levels for which an indication of a scale value was received, a part worth value for the attribute level as a function of the received indication of the scale value of the attribute level and the relative importance value assigned to the attribute to which the attribute level corresponds include instructions that, when executed by a computer, cause the computer to multiply the received indication of the scale value of the attribute level by the relative importance value assigned to the attribute to which the attribute level corresponds.

7. A computer-implemented method comprising:
   accessing, from a computer memory storage system, information about a type of product;
   based on the accessed information:
      identifying several attributes that are characteristic of the type of product, and
      identifying, for each of the several attributes, multiple different potential values for the attribute;
   receiving, from a user, an indication of a group of the several attributes that are to be grouped together, the group including less than all of the several attributes;
   receiving, from the user, indications of the user's preferences for individual attributes within the group of attributes relative to the user's preferences for other attributes within the group of attributes;
   based on the received indications of the user's preferences for individual attributes within the group of attributes, assigning a numeric relative importance value to each of the attributes within the group of attributes;
   for each of the attributes within the group of attributes:
      receiving, from the user, indications of the user's preferences for individual ones of the different potential values for the attribute,
      based on the received indications of the user's preferences for individual ones of the different potential values for the attribute, assigning numeric weights to each of the individual ones of the potential values for the attribute, and
      calculating part worth values for each of the individual ones of the different potential values for the attribute as a function of the numeric relative importance value assigned to the attribute and the numeric weights assigned to each of the individual ones of the potential values for the attributes,
   wherein receiving indications of the user's preferences for individual attributes within the group of attributes relative to the user's preferences for other attributes within the group of attributes includes:
      receiving, from the user, a ranked ordering of the attributes within the group of attributes, the ranked ordering specifying a particular attribute that the user prefers over the other attributes within the group of attributes, and
      for each attribute of a subset of the group of attributes that includes less than all of the attributes within the group of attributes and that does not include at least the attribute that the user prefers over the other attributes within the group of attributes and at least one other attribute within the group of attributes, receiving, from the user, an indication of the importance to the user of the attribute relative to an importance to the user of the attribute that the user prefers over the other attributes within the group of attributes;
   assigning a numeric relative importance value to each of the attributes within the group of attributes based on the received indications of the user's preferences for individual attributes within the group of attributes includes:
      assigning the attribute that the user prefers over the other attributes within the group of attributes a numeric relative importance value that reflects that the user prefers the attribute over the other attributes within the group of attributes,
      for each attribute within the subset of attributes, assigning a numeric relative importance value to the attribute as a function of the received indication of the importance to the user of the attribute relative to the importance to the user of the attribute that the user prefers over the other attributes within the group of attributes, and
      for each remaining attribute in the group of attributes not including the subset of attributes and the attribute that the user prefers over the other attributes within the group of attributes, assigning a numeric relative importance value to the attribute as a function of a position of the attribute within the received ranked ordering of the attributes within the group of attributes.

8. The computer-implemented method of claim 7 further comprising:
   soliciting, from the user, indications of the importance to the user of individual attributes within the group of attributes relative to an importance to the user of the attribute that the user prefers over the other attributes within the group of attributes;
   after initiating solicitation of the indications of the importance to the user of individual attributes within the group of attributes relative to an importance to the user of the attribute that the user prefers over the other attributes within the group of attributes and after receiving the indications of the importance to the user relative to the importance to the user of the attribute that the user prefers over the other attributes within the group of attributes of each of the attributes in the subset of attributes, determining that a threshold condition has been satisfied;
   as a consequence of having determined that the threshold condition has been satisfied, triggering an end to the solicitation of the indications of the importance to the user of individual attributes within the group of attributes relative to the importance to the user of the attribute that the user prefers over the other attributes within the group of attributes; and
   determining that, after triggering the end to the solicitation of the indications of the importance to the user of individual attributes within the group of attributes relative to the importance to the user of the attribute that the user prefers over the other attributes within the group of attributes, indications of the importance to the user of individual attributes relative to the importance to the user of the attribute that the user prefers over the other attributes within the group of attributes have been received for fewer than all of the attributes within the group of attributes, wherein:
      assigning a numeric relative importance value to each remaining attribute in the group of attributes not including the subset of attributes and the attribute that the user prefers over the other attributes within the group of attributes as a function of a position of the attribute within the received ranked ordering of the attributes within the group of attributes includes assigning a numeric relative importance value to each remaining attribute in the group of attributes not including the subset of attributes and the attribute that the user prefers over the other attributes within the group of attributes as a function of a position of the attribute within the received ranked ordering of the attributes within the group of attributes as a consequence of having determined that the threshold condition has been satisfied and as a consequence of having determined that indications of the importance to the user of individual attributes relative to the importance to the user of the attribute that the user prefers over the other attributes within the group of attributes have been received for fewer than all of the attributes within the group of attributes.

9. The computer-implemented method of claim 8 wherein:
determining that a threshold condition has been satisfied includes determining that a threshold period of time has elapsed since initiating the solicitation of the indications of the importance to the user of individual attributes within the group of attributes relative to the importance to the user of the attribute that the user prefers over the other attributes within the group of attributes; and triggering an end to the solicitation of the indications of the importance to the user of individual attributes within the group of attributes relative to the importance to the user of the attribute that the user prefers over the other attributes within the group of attributes as a consequence of having determined that the threshold condition has been satisfied includes triggering an end to the solicitation of the indications of the importance to the user of individual attributes within the group of attributes relative to the importance to the user of the attribute that the user prefers over the other attributes within the group of attributes as a consequence of having determined that the threshold period of time has elapsed since initiating the solicitation of the indications of the importance to the user of individual attributes within the group of attributes relative to the importance to the user of the attribute that the user prefers over the other attributes within the group of attributes.

10. The computer-implemented method of claim 8 wherein:
determining that a threshold condition has been satisfied includes determining that indications of the importance to the user of individual attributes within the group of attributes relative to the importance to the user of the attribute that the user prefers over the other attributes within the group of attributes have been received for a threshold percentage of the attributes within the group of attributes; and triggering an end to the solicitation of the indications of the importance to the user of individual attributes within the group of attributes relative to the importance to the user of the attribute that the user prefers over the other attributes within the group of attributes as a consequence of having determined that the threshold condition has been satisfied includes triggering an end to the solicitation of the indications of the importance to the user of individual attributes within the group of attributes relative to the importance to the user of the attribute that the user prefers over the other attributes within the group of attributes as a consequence of having determined that indications of the importance to the user of individual attributes within the group of attributes relative to the importance to the user of the attribute that the user prefers over the other attributes within the group of attributes have been received for the threshold percentage of the attributes within the group of attributes.

11. The computer-implemented method of claim 8 wherein:
determining that a threshold condition has been satisfied includes determining that indications of the importance to the user of individual attributes within the group of attributes relative to the importance to the user of the attribute that the user prefers over the other attributes within the group of attributes have been received for a threshold number of the attributes within the group of attributes; and triggering an end to the solicitation of the indications of the importance to the user of individual attributes within the group of attributes relative to the importance to the user of the attribute that the user prefers over the other attributes within the group of attributes as a consequence of having determined that the threshold condition has been satisfied includes triggering an end to the solicitation of the indications of the importance to the user of individual attributes within the group of attributes relative to the importance to the user of the attribute that the user prefers over the other attributes within the group of attributes as a consequence of having determined that indications of the importance to the user of individual attributes within the group of attributes relative to the importance to the user of the attribute that the user prefers over the other attributes within the group of attributes have been received for the threshold number of the attributes within the group of attributes.

12. A computer-readable medium storing instructions that, when executed by a computer, cause the computer to:
access, from a computer memory storage system, information about a type of product;
based on the accessed information:
identify several attributes that are characteristic of the type of product, and
identify, for each of the several attributes, multiple different potential values for the attribute;
receive, from a user, an indication of a group of the several attributes that are to be grouped together, the group including less than all of the several attributes;
receive, from the user, indications of the user's preferences for individual attributes within the group of attributes relative to the user's preferences for other attributes within the group of attributes;
based on the received indications of the user's preferences for individual attributes within the group of attributes, assign a numeric relative importance value to each of the attributes within the group of attributes;
for each of the attributes within the group of attributes:
receive, from the user, indications of the user's preferences for individual ones of the different potential values for the attribute,
based on the received indications of the user's preferences for individual ones of the different potential values for the attribute, assign numeric weights to each of the individual ones of the potential values for the attribute, and
calculate part worth values for each of the individual ones of the different potential values for the attribute as a function of the numeric relative importance value assigned to the attribute and the numeric weights assigned to each of the individual ones of the potential values for the attributes,
wherein the instructions that, when executed by a computer, cause the computer to receive indications of the user's preferences for individual attributes within the group of attributes relative to the user's preferences for other attributes within the group of attributes include instructions that, when executed by a computer, cause the computer to:

receive, from the user, a ranked ordering of the attributes within the group of attributes, the ranked ordering specifying a particular attribute that the user prefers over the other attributes within the group of attributes, and for each attribute of a subset of the group of attributes that includes less than all of the attributes within the group of attributes and that does not include at least the attribute that the user prefers over the other attributes within the group of attributes and at least one other attribute within the group of attributes, receive, from the user, an indication of the importance to the user of the attribute relative to an importance to the user of the attribute that the user prefers over the other attributes within the group of attributes;

the instructions that, when executed by a computer, cause the computer to assign a numeric relative importance value to each of the attributes within the group of attributes based on the received indications of the user's preferences for individual attributes within the group of attributes include instructions that, when executed by a computer, cause the computer to:

assign the attribute that the user prefers over the other attributes within the group of attributes a numeric relative importance value that reflects that the user prefers the attribute over the other attributes within the group of attributes, for each attribute within the subset of attributes, assign a numeric relative importance value to the attribute as a function of the received indication of the importance to the user of the attribute relative to the importance to the user of the attribute that the user prefers over the other attributes within the group of attributes, and for each remaining attribute in the group of attributes not including the subset of attributes and the attribute that the user prefers over the other attributes within the group of attributes, assign a numeric relative importance value to the attribute as a function of a position of the attribute within the received ranked ordering of the attributes within the group of attributes.

13. The computer-readable medium of claim 12 further storing instructions that, when executed by a computer, cause the computer to:

solicit, from the user, indications of the importance to the user of individual attributes within the group of attributes relative to an importance to the user of the attribute that the user prefers over the other attributes within the group of attributes;

after initiating solicitation of the indications of the importance to the user of individual attributes within the group of attributes relative to an importance to the user of the attribute that the user prefers over the other attributes within the group of attributes and after receiving the indications of the importance to the user relative to the importance to the user of the attribute that the user prefers over the other attributes within the group of attributes of each of the attributes in the subset of attributes, determine that a threshold condition has been satisfied;

as a consequence of having determined that the threshold condition has been satisfied, trigger an end to the solicitation of the indications of the importance to the user of individual attributes within the group of attributes relative to the importance to the user of the attribute that the user prefers over the other attributes within the group of attributes; and determine that, after triggering the end to the solicitation of the indications of the importance to the user of individual attributes within the group of attributes relative to the importance to the user of the attribute that the user prefers over the other attributes within the group of attributes, indications of the importance to the user of individual attributes relative to the importance to the user of the attribute that the user prefers over the other attributes within the group of attributes have been received for fewer than all of the attributes within the group of attributes, wherein:

the instructions that, when executed by a computer, cause the computer to assign a numeric relative importance value to each remaining attribute in the group of attributes not including the subset of attributes and the attribute that the user prefers over the other attributes within the group of attributes as a function of a position of the attribute within the received ranked ordering of the attributes within the group of attributes include instructions that, when executed by a computer, cause the computer to assign a numeric relative importance value to each remaining attribute in the group of attributes not including the subset of attributes and the attribute that the user prefers over the other attributes within the group of attributes as a function of a position of the attribute within the received ranked ordering of the attributes within the group of attributes as a consequence of having determined that the threshold condition has been satisfied and as a consequence of having determined that indications of the importance to the user of individual attributes relative to the importance to the user of the attribute that the user prefers over the other attributes within the group of attributes have been received for fewer than all of the attributes within the group of attributes.

14. The computer-readable storage medium of claim 13 wherein:

the instructions that, when executed by a computer, cause the computer to determine that a threshold condition has been satisfied include instructions that, when executed by a computer, cause the computer to determine that a threshold period of time has elapsed since initiating the solicitation of the indications of the importance to the user of individual attributes within the group of attributes relative to the importance to the user of the attribute that the user prefers over the other attributes within the group of attributes; and the instructions that, when executed by a computer, cause the computer to trigger an end to the solicitation of the indications of the importance to the user of individual attributes within the group of attributes relative to the importance to the user of the attribute that the user prefers over the other attributes within the group of attributes as a consequence of having determined that the threshold condition has been satisfied include instructions that, when executed by a computer, cause the computer to trigger an end to the solicitation of the indications of the importance to the user of individual attributes within the group of attributes relative to the importance to the user of the attribute that the user prefers over the other attributes within the group of attributes as a consequence of having determined that the threshold period of time has elapsed since initiating the solicitation of the indications of the importance to the user of individual attributes within the group of attributes relative to the importance to the user of the attribute that the user prefers over the other attributes within the group of attributes.

15. The computer-readable storage medium of claim 13 wherein:
the instructions that, when executed by a computer, cause the computer to determine that a threshold condition has been satisfied include instructions that, when executed by a computer, cause the computer to determine that indications of the importance to the user of individual attributes within the group of attributes relative to the importance to the user of the attribute that the user prefers over the other attributes within the group of attributes have been received for a threshold percentage of the attributes within the group of attributes; and
the instructions that, when executed by a computer, cause the computer to trigger an end to the solicitation of the indications of the importance to the user of individual attributes within the group of attributes relative to the importance to the user of the attribute that the user prefers over the other attributes within the group of attributes as a consequence of having determined that the threshold condition has been satisfied include instructions that, when executed by a computer, cause the computer to trigger an end to the solicitation of the indications of the importance to the user of individual attributes within the group of attributes relative to the importance to the user of the attribute that the user prefers over the other attributes within the group of attributes as a consequence of having determined that indications of the importance to the user of individual attributes within the group of attributes relative to the importance to the user of the attribute that the user prefers over the other attributes within the group of attributes have been received for the threshold percentage of the attributes within the group of attributes.

16. The computer-readable storage medium of claim 13 wherein:
the instructions that, when executed by a computer, cause the computer to determine that a threshold condition has been satisfied include instructions that, when executed by a computer, cause the computer to determine that indications of the importance to the user of individual attributes within the group of attributes relative to the importance to the user of the attribute that the user prefers over the other attributes within the group of attributes have been received for a threshold number of the attributes within the group of attributes; and
the instructions that, when executed by a computer, cause the computer to trigger an end to the solicitation of the indications of the importance to the user of individual attributes within the group of attributes relative to the importance to the user of the attribute that the user prefers over the other attributes within the group of attributes as a consequence of having determined that the threshold condition has been satisfied include instructions that, when executed by a computer, cause the computer to trigger an end to the solicitation of the indications of the importance to the user of individual attributes within the group of attributes relative to the importance to the user of the attribute that the user prefers over the other attributes within the group of attributes as a consequence of having determined that indications of the importance to the user of individual attributes within the group of attributes relative to the importance to the user of the attribute that the user prefers over the other attributes within the group of attributes have been received for the threshold number of the attributes within the group of attributes.

17. A computer-readable storage medium storing instructions that, when executed by a computer, cause a computer to:
access a computer memory storage system that stores information related to attributes that are characteristic of a type of product;
based on accessing the computer memory storage system, identify attributes that are characteristic of the product from the computer memory storage system, each of the attributes identified from the computer memory storage system having different attribute levels that reflect different possible values for the attribute;
cause a display of a graphical user interface that presents to a user indications of multiple of the identified attributes that are characteristic of the product as well as selectable indications of multiple different attribute levels for each of the multiple attributes;
for each of the multiple attributes presented in the graphical user interface, receive, as a result of user interaction with the selectable indications of attribute levels presented in the graphical user interface, an indication of attribute levels designated by the user as being acceptable for the attribute;
cause the graphical user interface to present to the user indications of each of the multiple attributes as well as corresponding selectable indications of the attribute levels designated as being acceptable for each of the multiple attributes;
for each of the multiple attributes, determine, as a result of user interaction with the selectable indications of attributes levels designated as being acceptable for the attributes, an indication of an attribute level designated by the user as being the user's least preferred attribute level for the attribute and an indication of an attribute level designated by the user as being the user's most preferred attribute level for the attribute;
cause the graphical user interface to request the user to identify, from among the multiple attributes, a group of attributes that represents attributes that are important to the user relative to other of the multiple attributes;
receive, as a result of user interaction with the graphical user interface, indications of attributes, from among the multiple attributes, that the user identified as belonging to the group of attributes that are important to the user relative to other of the multiple attributes;
based on receiving the indications of attributes that the user identified as belonging to the group of attributes that are important to the user relative to other of the multiple attributes, sort the multiple attributes into at least two different piles of attributes, the different piles being disjoint and a particular one of the piles including the attributes that the user identified as belonging to the group of attributes that are important to the user relative to other of the multiple attributes;
cause the graphical user interface to present to the user indications of the attributes belonging to the particular pile that includes the attributes that the user identified as belonging to the group of attributes that are important to the user relative to other of the multiple attributes and to request the user to provide a ranked order of the attributes belonging to the particular pile;
receive, as a result of user interaction with the graphical user interface, an indication of a ranked order of the attributes belonging to the particular pile that includes the attributes that the user identified as belonging to the group of attributes that are important to the user relative to other of the multiple attributes;

based on receiving the indication of the ranked order of the attributes belonging to the particular pile that includes the attributes that the user identified as belonging to the group of attributes that are important to the user relative to other of the multiple attributes, identify a particular attribute as an attribute that is most important to the user;

for each attribute among a subset of the attributes belonging to the particular pile that includes the attributes that the user identified as belonging to the group of attributes that are important to the user relative to other of the multiple attributes, the subset excluding the most important attribute to the user and one or more other attributes belonging to the particular pile that includes the attributes that the user identified as belonging to the group of attributes that are important to the user relative to other of the multiple attributes, cause the graphical user interface to request the user to rate the importance of the difference between the user's least preferred attribute level for the attribute and the user's most preferred attribute level for the attribute relative to the difference between the user's least preferred attribute level for the most important attribute to the user and the user's most preferred attribute level for the most important attribute level to the user;

for each attribute of the subset of attributes, receive, as a result of user interaction with the graphical user interface, an indication of the importance of the difference between the user's least preferred attribute level for the attribute and the user's most preferred attribute level for the attribute relative to the difference between the user's least preferred attribute level for the most important attribute to the user and the user's most preferred attribute level for the most important attribute to the user;

for each attribute of the subset of attributes, assign a relative importance value to the attribute based on the received indication of the importance of the difference between the user's least preferred attribute level for the attribute and the user's most preferred attribute level for the attribute relative to the difference between the user's least preferred attribute level for the most important attribute to the user and the user's most preferred attribute level for the most important attribute to the user;

for each of at least two attributes that belong to the particular pile that includes the attributes that the user identified as belonging to the group of attributes that are important to the user relative to other of the multiple attributes but that are not included in the subset of attributes, assign a relative importance value to the attribute based on the ranking of the attribute within the ranked order of the attributes;

for each of several attributes belonging to the particular pile that includes the attributes that the user identified as belonging to the group of attributes that are important to the user relative to other of the multiple attributes:
  assign a scale value to the user's least preferred attribute level for the attribute,
  assign a scale value to the user's most preferred attribute level for the attribute, and
  cause the graphical user interface to request the user to assign a scale value to at least one acceptable attribute level other than the user's least preferred attribute level for the attribute and the user's most preferred attribute level for the attribute relative to the scale values assigned to the user's least preferred attribute level for the attribute and the user's most preferred attribute level for the attribute;

for each of several attributes belonging to the particular pile that includes the attributes that the user identified as belonging to the group of attributes that are important to the user relative to other of the multiple attributes, receive, as a result of user interaction with the graphical user interface, an indication of a scale value for at least one acceptable attribute level other than the user's least preferred attribute level for the attribute and the user's most preferred attribute level for the attribute, the received scale value indication for the attribute level being relative to the scale values assigned to the user's least preferred attribute level and the user's most preferred attribute level;

compare received scale value indications to attribute levels designated by the user as being acceptable;

validate received scale value indications based on results of comparing received scale value indications to attribute levels designated by the user as being acceptable;

for each of several attribute levels for which an indication of a scale value was received, calculate a part worth value for the attribute level as a function of the received indication of the scale value of the attribute level and the relative importance value assigned to the attribute to which the attribute level corresponds; and cause the graphical user interface to display at least one of the calculated part worth values.

18. The computer-readable storage medium of claim 17, wherein the instructions that, when executed by a computer, cause the computer to calculate a part worth value for the attribute level as a function of the received indication of the scale value of the attribute level and the relative importance value assigned to the attribute to which the attribute level corresponds include instructions that, when executed by a computer, cause the computer to multiply the received indication of the scale value of the attribute level by the relative importance value assigned to the attribute to which the attribute level corresponds.

19. The computer-readable storage medium of claim 17 further storing instructions that, when executed by a computer, cause the computer to provide an offer to the consumer based on one or more of the calculated part worth values.

20. The computer-readable storage medium of claim 19 wherein the instructions that, when executed by a computer, cause the computer to provide an offer to the consumer based on one or more of the calculated part worth values include instructions that, when executed by a computer, cause the computer to provide an offer to sell the product to the consumer.

21. The computer-readable storage medium of claim 17 wherein the instructions that, when executed by a computer, cause the computer to sort the multiple attributes into at least two different piles of attributes include instructions that, when executed by a computer, cause the computer to exclude attributes sorted into piles other than the particular pile from further consideration by the user during the survey.

* * * * *